US010848436B1

United States Patent
Ganjam et al.

(10) Patent No.: US 10,848,436 B1
(45) Date of Patent: Nov. 24, 2020

(54) DYNAMIC BITRATE RANGE SELECTION IN THE CLOUD FOR OPTIMIZED VIDEO STREAMING

(71) Applicant: Conviva Inc., Foster City, CA (US)

(72) Inventors: Aditya Ravikumar Ganjam, San Francisco, CA (US); Jibin Zhan, Foster City, CA (US); Faisal Zakaria Siddiqi, San Jose, CA (US); Alexey Serbin, Palo Alto, CA (US); Davis Shepherd, Portola Valley, CA (US); Oleg Vasilyev, Palo Alto, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 16/197,102

(22) Filed: Nov. 20, 2018

Related U.S. Application Data

(63) Continuation of application No. 14/871,624, filed on Sep. 30, 2015, now Pat. No. 10,178,043.

(60) Provisional application No. 62/089,158, filed on Dec. 8, 2014, provisional application No. 62/161,790, filed on May 14, 2015.

(51) Int. Cl.
*H04L 12/927* (2013.01)
*H04L 29/06* (2006.01)
*H04L 29/08* (2006.01)

(52) U.S. Cl.
CPC .......... *H04L 47/801* (2013.01); *H04L 65/604* (2013.01); *H04L 67/10* (2013.01)

(58) Field of Classification Search
CPC ...... H04L 47/801; H04L 65/604; H04L 67/10
See application file for complete search history.

(56) References Cited

U.S. PATENT DOCUMENTS

| | | | |
|---|---|---|---|
| 5,926,204 A | 7/1999 | Mayer |
| 5,930,473 A | 7/1999 | Teng |
| 5,987,621 A | 11/1999 | Duso |
| 6,006,264 A | 12/1999 | Colby |
| 6,026,077 A | 2/2000 | Iwata |
| 6,032,857 A | 3/2000 | Kitagawa |
| 6,188,993 B1 | 2/2001 | Eng |
| 6,208,977 B1 | 3/2001 | Hernandez |
| 6,223,206 B1 | 4/2001 | Dan |
| 6,250,557 B1 | 6/2001 | Forslund |
| 6,279,039 B1 | 8/2001 | Bhat |

(Continued)

OTHER PUBLICATIONS

"Firefly-Inspired Heartbeat Synchronization in Overlay Networks"—Bind et al., University of Bologna, Italy, Feb. 2007 http://www.cs.unibo.it/babaoglu/courses/cas06-07/papers/pdf/fireflies.pdf.

(Continued)

*Primary Examiner* — Gil H. Lee
*Assistant Examiner* — Chhian (Amy) Liang
(74) *Attorney, Agent, or Firm* — Van Pelt, Yi & James LLP

(57) ABSTRACT

Selecting an optimal bitrate range is disclosed. A request for content from a first client is received. An optimal subset of bitrates for the first client is determined. The optimal subset of bitrates for the first client is determined based at least in part on one or more real-time quality measures. A different optimal subset of bitrates is determined for a second client. An indication of the optimal subset of bitrates determined for the first client is provided to the first client. The first client is configured to obtain content according to the indication of the optimal subset of bitrates.

15 Claims, 15 Drawing Sheets

(56) References Cited

U.S. PATENT DOCUMENTS

| | | |
|---|---|---|
| 6,324,565 B1 | 11/2001 | Holt, III |
| 6,377,996 B1 | 4/2002 | Lumelsky |
| 6,405,251 B1 | 6/2002 | Bullard |
| 6,434,159 B1 | 8/2002 | Woodward |
| 6,438,592 B1 | 8/2002 | Killian |
| 6,469,991 B1 | 10/2002 | Chuah |
| 6,470,389 B1 | 10/2002 | Chung |
| 6,487,540 B1 | 11/2002 | Smith |
| 6,502,747 B1 | 1/2003 | Stoutenburg |
| 6,542,933 B1 | 4/2003 | Durst, Jr. |
| 6,711,622 B1 | 3/2004 | Fuller |
| 6,735,630 B1 | 5/2004 | Gelvin |
| 6,754,833 B1 | 6/2004 | Black |
| 6,769,028 B1 | 7/2004 | Sass |
| 6,836,691 B1 | 12/2004 | Stirton |
| 6,892,236 B1 | 5/2005 | Conrad |
| 6,892,307 B1 | 5/2005 | Wood |
| 6,906,743 B1 | 6/2005 | Maurer |
| 6,920,580 B1 | 7/2005 | Cramer |
| 6,941,270 B1 | 9/2005 | Hannula |
| 6,950,855 B2 | 9/2005 | Sampathkumar |
| 7,006,666 B2 | 2/2006 | Montgomery |
| 7,010,598 B2 | 3/2006 | Sitaraman |
| 7,020,082 B2 | 3/2006 | Bhagavath |
| 7,024,452 B1 | 4/2006 | O'Connell, Jr. |
| 7,024,468 B1 | 4/2006 | Meyer |
| 7,039,694 B2 | 5/2006 | Kampe |
| 7,092,696 B1 | 8/2006 | Hosain |
| 7,139,834 B1 | 11/2006 | Albanese |
| 7,159,234 B1 | 1/2007 | Murphy |
| 7,222,190 B2 | 5/2007 | Klinker |
| 7,233,926 B2 | 6/2007 | Durand |
| 7,277,896 B2 | 10/2007 | Matsubara |
| 7,313,087 B2 | 12/2007 | Patil |
| 7,318,107 B1 | 1/2008 | Menon |
| 7,353,023 B1 * | 4/2008 | Link, II ............... H04W 4/14 455/414.2 |
| 7,356,341 B2 | 4/2008 | Nanda |
| 7,367,044 B2 | 4/2008 | Fowler |
| 7,373,415 B1 | 5/2008 | Deshan |
| 7,389,537 B1 | 6/2008 | Callon |
| 7,487,509 B2 | 2/2009 | Hugly |
| 7,490,136 B2 | 2/2009 | Suzuki |
| 7,509,372 B2 | 3/2009 | Dutta |
| 7,519,703 B1 | 4/2009 | Stuart |
| 7,574,488 B2 | 8/2009 | Matsubara |
| 7,593,333 B2 | 9/2009 | Li |
| 7,599,698 B2 | 10/2009 | Cheng |
| 7,617,525 B1 | 11/2009 | Moeck |
| 7,620,848 B1 | 11/2009 | Tanner |
| 7,627,872 B2 | 12/2009 | Hebeler |
| 7,668,761 B2 | 2/2010 | Jenkins |
| 7,668,914 B2 | 2/2010 | Parker |
| 7,689,485 B2 | 3/2010 | Kanekar |
| 7,689,508 B2 | 3/2010 | Davis |
| 7,698,460 B2 | 4/2010 | Zhang |
| 7,702,581 B2 | 4/2010 | Hogl |
| 7,721,292 B2 | 5/2010 | Frasier |
| 7,725,576 B2 | 5/2010 | Sitaraman |
| 7,792,889 B2 | 9/2010 | Lee |
| 7,813,326 B1 | 10/2010 | Kelm |
| 7,844,491 B1 | 11/2010 | Haitsuka |
| 7,853,529 B1 | 12/2010 | Walker |
| 7,873,727 B2 | 1/2011 | Pal |
| 7,904,580 B2 | 3/2011 | Mandera |
| 7,921,215 B2 | 4/2011 | Dessart |
| 7,921,222 B2 | 4/2011 | Courtemanche |
| 7,930,347 B2 | 4/2011 | Maxwell |
| 7,941,823 B2 | 5/2011 | Hasek |
| 7,969,987 B1 | 6/2011 | Hansen |
| 7,970,402 B2 | 6/2011 | Wu |
| 8,028,159 B2 | 9/2011 | Li |
| 8,038,535 B2 | 10/2011 | Jensen |
| 8,046,765 B2 | 10/2011 | Cherkasova |
| 8,098,160 B2 | 1/2012 | Howarth |
| 8,108,403 B2 | 1/2012 | Gopalraj |
| 8,135,855 B2 | 3/2012 | Sitaraman |
| 8,156,204 B2 | 4/2012 | Leblanc |
| 8,182,326 B2 | 5/2012 | Speer, II |
| 8,230,105 B2 | 7/2012 | Melnyk |
| 8,234,350 B1 | 7/2012 | Gu |
| 8,259,597 B1 | 9/2012 | Oak |
| 8,370,887 B2 | 2/2013 | Virdi |
| 8,374,929 B1 | 2/2013 | Lappas |
| 8,387,094 B1 | 2/2013 | Ho |
| 8,402,494 B1 | 3/2013 | Hu |
| 8,417,797 B2 | 4/2013 | Thoen |
| 8,484,319 B2 | 7/2013 | Wein |
| 8,489,683 B2 | 7/2013 | Leblanc |
| 8,489,923 B1 | 7/2013 | Lakshminarayanan |
| 8,555,355 B2 | 10/2013 | Rathbun |
| 8,589,473 B2 | 11/2013 | Bruss |
| 8,639,553 B1 | 1/2014 | Knauth |
| 8,647,203 B2 | 2/2014 | Albrecht |
| 8,677,428 B2 | 3/2014 | Lewis |
| 8,683,066 B2 | 3/2014 | Hurst |
| 8,719,876 B2 | 5/2014 | Kotecha |
| 8,751,605 B1 | 6/2014 | Zhang |
| 8,751,679 B2 | 6/2014 | McHugh |
| 8,843,597 B2 | 9/2014 | Leblanc |
| 8,874,725 B1 | 10/2014 | Ganjam |
| 8,874,964 B1 | 10/2014 | Lakshminarayanan |
| 8,898,338 B1 | 11/2014 | McGowan |
| 8,909,736 B1 | 12/2014 | Bosch |
| 8,924,996 B2 | 12/2014 | Shafiee |
| 8,930,991 B2 | 1/2015 | Philpott |
| 8,943,170 B2 | 1/2015 | Li |
| 8,954,491 B1 | 2/2015 | Medved |
| 9,098,844 B2 | 8/2015 | Davis |
| 9,100,288 B1 | 8/2015 | Ganjam |
| 9,100,826 B2 | 8/2015 | Weiss |
| 9,246,965 B1 | 1/2016 | Stoica |
| 9,264,780 B1 | 2/2016 | Stoica |
| 9,356,821 B1 | 5/2016 | Jagannathan |
| 9,456,015 B2 | 9/2016 | Chen |
| 9,549,043 B1 | 1/2017 | Stoica |
| 9,613,042 B1 | 4/2017 | Joseph |
| 9,819,566 B1 | 11/2017 | Ganjam |
| 9,898,781 B1 | 2/2018 | Silverman |
| 10,021,672 B2 | 7/2018 | Cole |
| 10,530,852 B2 | 1/2020 | Newton |
| 2002/0002708 A1 | 1/2002 | Arye |
| 2002/0016831 A1 | 2/2002 | Peled |
| 2002/0029190 A1 | 3/2002 | Gutierrez-Sheris |
| 2002/0052841 A1 | 5/2002 | Guthrie |
| 2002/0082730 A1 | 6/2002 | Capps |
| 2002/0095400 A1 | 7/2002 | Johnson |
| 2002/0126135 A1 | 9/2002 | Ball |
| 2002/0133601 A1 | 9/2002 | Kennamer |
| 2002/0141343 A1 | 10/2002 | Bays |
| 2002/0143798 A1 | 10/2002 | Lisiecki |
| 2002/0175934 A1 | 11/2002 | Hand |
| 2002/0183972 A1 | 12/2002 | Enck |
| 2002/0184357 A1 | 12/2002 | Traversat |
| 2002/0198984 A1 | 12/2002 | Goldstein |
| 2003/0046383 A1 | 3/2003 | Lee |
| 2003/0046396 A1 | 3/2003 | Richter |
| 2003/0046704 A1 | 3/2003 | Laksono |
| 2003/0046708 A1 | 3/2003 | Jutzi |
| 2003/0050966 A1 | 3/2003 | Dutta |
| 2003/0051051 A1 | 3/2003 | O'Neal |
| 2003/0061305 A1 | 3/2003 | Copley |
| 2003/0061356 A1 | 3/2003 | Jason, Jr. |
| 2003/0065739 A1 | 4/2003 | Shnier |
| 2003/0065763 A1 | 4/2003 | Swildens |
| 2003/0074142 A1 | 4/2003 | Steeg |
| 2003/0084003 A1 | 5/2003 | Pinkas |
| 2003/0105850 A1 | 6/2003 | Lean |
| 2003/0135593 A1 | 7/2003 | Lee |
| 2003/0140108 A1 | 7/2003 | Sampathkumar |
| 2003/0140180 A1 | 7/2003 | Brown |
| 2003/0145066 A1 | 7/2003 | Okada |
| 2003/0169863 A1 | 9/2003 | Hernandez |
| 2003/0204613 A1 | 10/2003 | Hudson |

(56) References Cited

U.S. PATENT DOCUMENTS

| | | |
|---|---|---|
| 2004/0010544 A1 | 1/2004 | Slater |
| 2004/0019675 A1 | 1/2004 | Hebeler |
| 2004/0047354 A1 | 3/2004 | Slater |
| 2004/0049793 A1 | 3/2004 | Chou |
| 2004/0057420 A1 | 3/2004 | Curcio |
| 2004/0064556 A1 | 4/2004 | Zhang |
| 2004/0088347 A1 | 5/2004 | Yeager |
| 2004/0093155 A1 | 5/2004 | Simonds |
| 2004/0107387 A1 | 6/2004 | Larsson |
| 2004/0128682 A1 | 7/2004 | Liga |
| 2004/0133471 A1 | 7/2004 | Pisaris-Henderson |
| 2004/0136327 A1 | 7/2004 | Sitaraman |
| 2004/0158643 A1 | 8/2004 | Suzuki |
| 2004/0162901 A1 | 8/2004 | Mangipudi |
| 2004/0187159 A1 | 9/2004 | Gaydos |
| 2004/0193716 A1 | 9/2004 | McConnell |
| 2004/0233918 A1 | 11/2004 | Larsson |
| 2004/0236846 A1 | 11/2004 | Alvarez |
| 2004/0267691 A1 | 12/2004 | Vasudeva |
| 2005/0010915 A1 | 1/2005 | Chen |
| 2005/0021715 A1 | 1/2005 | Dugatkin |
| 2005/0060158 A1 | 3/2005 | Endo |
| 2005/0076104 A1 | 4/2005 | Liskov |
| 2005/0086300 A1 | 4/2005 | Yeager |
| 2005/0086469 A1 | 4/2005 | Dunagan |
| 2005/0089043 A1 | 4/2005 | Seckin |
| 2005/0114262 A1 | 5/2005 | Howard |
| 2005/0120131 A1 | 6/2005 | Allen |
| 2005/0169179 A1 | 8/2005 | Antal |
| 2005/0177785 A1 | 8/2005 | Shrader |
| 2005/0183120 A1 | 8/2005 | Jain |
| 2005/0187873 A1 | 8/2005 | Labrou |
| 2005/0243735 A1 | 11/2005 | Kashima |
| 2005/0251835 A1 | 11/2005 | Scott |
| 2005/0278259 A1 | 12/2005 | Gunaseelan |
| 2006/0052100 A1 | 3/2006 | Almgren |
| 2006/0059248 A1 | 3/2006 | Ikeda |
| 2006/0075094 A1 | 4/2006 | Wen |
| 2006/0085246 A1 | 4/2006 | Li |
| 2006/0100932 A1 | 5/2006 | Ohmori |
| 2006/0123080 A1 | 6/2006 | Baudino |
| 2006/0135172 A1 | 6/2006 | Dronne |
| 2006/0136218 A1 | 6/2006 | Lee |
| 2006/0136597 A1 | 6/2006 | Shabtai |
| 2006/0143350 A1 | 6/2006 | Miloushev |
| 2006/0165060 A1 | 7/2006 | Dua |
| 2006/0168304 A1 | 7/2006 | Bauer |
| 2006/0179154 A1 | 8/2006 | Sitaraman |
| 2006/0190615 A1 | 8/2006 | Panwar |
| 2006/0206539 A1 | 9/2006 | Thompson |
| 2006/0236017 A1 | 10/2006 | Rooholamini |
| 2006/0246880 A1 | 11/2006 | Baldwin |
| 2006/0259949 A1 | 11/2006 | Schaefer |
| 2006/0285489 A1 | 12/2006 | Francisco |
| 2007/0005809 A1 | 1/2007 | Kobayashi |
| 2007/0025381 A1 | 2/2007 | Feng |
| 2007/0041584 A1 | 2/2007 | O'Connor |
| 2007/0055632 A1 | 3/2007 | Hogl |
| 2007/0066403 A1 | 3/2007 | Conkwright |
| 2007/0097997 A1 | 5/2007 | MacLean |
| 2007/0101202 A1 | 5/2007 | Garbow |
| 2007/0125840 A1 | 6/2007 | Law |
| 2007/0136311 A1 | 6/2007 | Kasten |
| 2007/0140113 A1 | 6/2007 | Gemelos |
| 2007/0150612 A1 | 6/2007 | Chaney |
| 2007/0183427 A1 | 8/2007 | Nylander |
| 2007/0198413 A1 | 8/2007 | Nagao |
| 2007/0204011 A1 | 8/2007 | Shaver |
| 2007/0232332 A1 | 10/2007 | Holur |
| 2007/0250560 A1 | 10/2007 | Wein |
| 2007/0265984 A1 | 11/2007 | Santhana |
| 2007/0282994 A1 | 12/2007 | Beers |
| 2007/0286351 A1 | 12/2007 | Ethier |
| 2007/0288638 A1 | 12/2007 | Vuong |
| 2008/0016205 A1 | 1/2008 | Svendsen |
| 2008/0037438 A1 | 2/2008 | Twiss |
| 2008/0046499 A1 | 2/2008 | Cabrera |
| 2008/0046777 A1 | 2/2008 | Chen |
| 2008/0046974 A1 | 2/2008 | Minodier |
| 2008/0049616 A1 | 2/2008 | Kamath |
| 2008/0049786 A1 | 2/2008 | Ram |
| 2008/0052226 A1 | 2/2008 | Agarwal |
| 2008/0063195 A1 | 3/2008 | Li |
| 2008/0096562 A1 | 4/2008 | Wu |
| 2008/0104454 A1 | 5/2008 | White |
| 2008/0112315 A1 | 5/2008 | Hu |
| 2008/0120707 A1 | 5/2008 | Ramia |
| 2008/0140520 A1 | 6/2008 | Hyder |
| 2008/0140688 A1 | 6/2008 | Clayton |
| 2008/0141131 A1 | 6/2008 | Cerny |
| 2008/0144513 A1 | 6/2008 | Small |
| 2008/0151821 A1 | 6/2008 | Cho |
| 2008/0155586 A1 | 6/2008 | Yang |
| 2008/0195461 A1 | 8/2008 | Li |
| 2008/0209499 A1 | 8/2008 | Ramesh |
| 2008/0215718 A1 | 9/2008 | Stolorz |
| 2008/0215756 A1 | 9/2008 | Lee |
| 2008/0235746 A1 | 9/2008 | Peters |
| 2008/0247326 A1 | 10/2008 | Cormier |
| 2008/0263180 A1 | 10/2008 | Hurst |
| 2008/0305801 A1 | 12/2008 | Burgess |
| 2008/0313040 A1 | 12/2008 | Rose |
| 2009/0010155 A1 | 1/2009 | Liu |
| 2009/0019503 A1 | 1/2009 | Vorbau |
| 2009/0043906 A1 | 2/2009 | Hurst |
| 2009/0059812 A1 | 3/2009 | Chinnaswamy |
| 2009/0082020 A1 | 3/2009 | Ch'ng |
| 2009/0083631 A1 | 3/2009 | Sidi |
| 2009/0106392 A1 | 4/2009 | Zuckerman |
| 2009/0117893 A1 | 5/2009 | Weigand |
| 2009/0119722 A1 | 5/2009 | Versteeg |
| 2009/0125625 A1 | 5/2009 | Shim |
| 2009/0150487 A1 | 6/2009 | Wolfish |
| 2009/0164656 A1 | 6/2009 | Guan |
| 2009/0170440 A1 | 7/2009 | Eyuboglu |
| 2009/0172200 A1 | 7/2009 | Morrison |
| 2009/0187956 A1 | 7/2009 | Sommer |
| 2009/0192929 A1 | 7/2009 | Hoeflinger |
| 2009/0234940 A1 | 9/2009 | Pal |
| 2009/0248872 A1 | 10/2009 | Luzzatti |
| 2009/0271101 A1 | 10/2009 | Relyea |
| 2009/0271520 A1 | 10/2009 | Siddiqui |
| 2009/0288012 A1 | 11/2009 | Hertel |
| 2009/0327489 A1 | 12/2009 | Swildens |
| 2009/0328124 A1 | 12/2009 | Khouzam |
| 2010/0043014 A1 | 2/2010 | Hebeler, Jr. |
| 2010/0080290 A1 | 4/2010 | Mehrotra |
| 2010/0088373 A1 | 4/2010 | Pinkham |
| 2010/0100635 A1 | 4/2010 | Takemura |
| 2010/0114562 A1 | 5/2010 | Hutchinson |
| 2010/0125675 A1 | 5/2010 | Richardson |
| 2010/0131642 A1 | 5/2010 | Chalikouras |
| 2010/0138273 A1 | 6/2010 | Bateni |
| 2010/0161729 A1 | 6/2010 | Leblanc |
| 2010/0169195 A1 | 7/2010 | Trest |
| 2010/0235503 A1 | 9/2010 | Sitaraman |
| 2010/0241701 A1 | 9/2010 | Lester |
| 2010/0302002 A1 | 12/2010 | Guo |
| 2010/0306368 A1 | 12/2010 | Gagliardi |
| 2011/0014972 A1 | 1/2011 | Herrmann |
| 2011/0016225 A1 | 1/2011 | Park |
| 2011/0047413 A1 | 2/2011 | McGill |
| 2011/0058675 A1 | 3/2011 | Brueck |
| 2011/0060649 A1 | 3/2011 | Dunk |
| 2011/0082946 A1 | 4/2011 | Gopalakrishnan |
| 2011/0119724 A1 | 5/2011 | Damola |
| 2011/0179435 A1 | 7/2011 | Cordray |
| 2011/0196943 A1 | 8/2011 | Bornstein |
| 2011/0202593 A1 | 8/2011 | Vaderna |
| 2011/0218957 A1 | 9/2011 | Coon |
| 2011/0235103 A1 | 9/2011 | Ito |
| 2011/0252138 A1 | 10/2011 | Ahuja |
| 2011/0258049 A1 | 10/2011 | Ramer |
| 2011/0296048 A1 | 12/2011 | Knox |

(56) References Cited

U.S. PATENT DOCUMENTS

| | | | |
|---|---|---|---|
| 2011/0314130 A1 | 12/2011 | Strasman | |
| 2012/0007866 A1 | 1/2012 | Tahan | |
| 2012/0047542 A1 | 2/2012 | Lewis | |
| 2012/0093098 A1 | 4/2012 | Charbit | |
| 2012/0110167 A1 | 5/2012 | Joch | |
| 2012/0124179 A1 | 5/2012 | Cappio | |
| 2012/0173753 A1 | 7/2012 | Moorthy | |
| 2012/0178426 A1 | 7/2012 | Filipov | |
| 2012/0198492 A1 | 8/2012 | Dhruv | |
| 2012/0204068 A1 | 8/2012 | Ye | |
| 2012/0204153 A1 | 8/2012 | Peterson | |
| 2012/0209717 A1 | 8/2012 | Henry | |
| 2012/0219271 A1* | 8/2012 | Vunic | G06K 9/00711 |
| | | | 386/278 |
| 2012/0221421 A1 | 8/2012 | Hammad | |
| 2012/0226734 A1 | 9/2012 | Poese | |
| 2012/0231885 A1 | 9/2012 | Speer, II | |
| 2012/0240176 A1 | 9/2012 | Ma | |
| 2012/0259698 A1 | 10/2012 | Yurow | |
| 2012/0265596 A1 | 10/2012 | Mazed | |
| 2012/0278496 A1 | 11/2012 | Hsu | |
| 2012/0311126 A1* | 12/2012 | Jadallah | H04N 21/23805 |
| | | | 709/224 |
| 2013/0024364 A1 | 1/2013 | Shrivastava | |
| 2013/0024371 A1 | 1/2013 | Hariramani | |
| 2013/0046861 A1 | 2/2013 | Biderman | |
| 2013/0067052 A1 | 3/2013 | Reynolds | |
| 2013/0067109 A1 | 3/2013 | Dong | |
| 2013/0091249 A1 | 4/2013 | McHugh | |
| 2013/0094445 A1 | 4/2013 | De Foy | |
| 2013/0124724 A1 | 5/2013 | Madgwick | |
| 2013/0132605 A1 | 5/2013 | Kocks | |
| 2013/0142129 A1 | 6/2013 | Rinne | |
| 2013/0144785 A1 | 6/2013 | Karpenko | |
| 2013/0151673 A1 | 6/2013 | Gouache | |
| 2013/0151687 A1 | 6/2013 | Mooneyham | |
| 2013/0159531 A1 | 6/2013 | Katyal | |
| 2013/0166332 A1 | 6/2013 | Hammad | |
| 2013/0198328 A1 | 8/2013 | Green et al. | |
| 2013/0198361 A1 | 8/2013 | Matsuzaki | |
| 2013/0218765 A1 | 8/2013 | Hammad | |
| 2013/0304642 A1 | 11/2013 | Campos | |
| 2013/0305299 A1 | 11/2013 | Bergstrom | |
| 2013/0326024 A1 | 12/2013 | Chen | |
| 2013/0336221 A1 | 12/2013 | Damola | |
| 2014/0019352 A1 | 1/2014 | Shrivastava | |
| 2014/0108671 A1 | 4/2014 | Watson | |
| 2014/0129303 A1 | 5/2014 | Aiglstorfer | |
| 2014/0143089 A1 | 5/2014 | Campos | |
| 2014/0149557 A1 | 5/2014 | Lohmar | |
| 2014/0150046 A1 | 5/2014 | Epstein | |
| 2014/0198641 A1 | 7/2014 | Perkuhn | |
| 2014/0245359 A1 | 8/2014 | De Foy | |
| 2014/0324690 A1 | 10/2014 | Allen | |
| 2014/0330980 A1 | 11/2014 | Richardson | |
| 2014/0337175 A1 | 11/2014 | Katzin | |
| 2014/0348049 A1 | 11/2014 | Kim | |
| 2015/0026239 A1 | 1/2015 | Hofmann | |
| 2015/0067185 A1* | 3/2015 | Tamblin | H04N 21/2407 |
| | | | 709/231 |
| 2015/0088607 A1 | 3/2015 | Georgoff | |
| 2015/0095704 A1 | 4/2015 | Sokolik | |
| 2015/0112774 A1 | 4/2015 | Georgoff | |
| 2015/0134431 A1 | 5/2015 | Georgoff | |
| 2015/0201042 A1* | 7/2015 | Shah | H04L 65/60 |
| | | | 709/219 |
| 2015/0220989 A1 | 8/2015 | Hayes | |
| 2015/0302456 A1 | 10/2015 | Rego | |
| 2015/0334153 A1 | 11/2015 | Koster | |
| 2015/0379554 A1 | 12/2015 | Copeland | |
| 2016/0055583 A1 | 2/2016 | Liberty | |
| 2016/0072716 A1 | 3/2016 | Chow | |
| 2016/0234293 A1 | 8/2016 | Berger | |
| 2016/0292731 A1 | 10/2016 | Khwaja | |
| 2016/0328272 A1 | 11/2016 | Ahmed | |
| 2017/0161717 A1 | 6/2017 | Xing | |
| 2017/0289188 A1 | 10/2017 | Shaikh | |
| 2017/0339222 A1 | 11/2017 | Newton | |

OTHER PUBLICATIONS

"Relay Nodes in Wireless Sensor Networks: A Survey"—Ataul Bad, University of Windsor, Nov. 2005, http://richard.myweb.cs.uwindsor.ca/cs510/survey_bari.pdf.

"Simple Opportunistic Routing Protocol for Wireless Mesh Networks"—Rozner et al, University of Texas at Austin, Aug. 2011 http://ericrozner.com/papers/wimesh06.pdf.

Elo et al., "Virtual URLs for Browsing & Searching Large Information Spaces", WebNet Journal, pp. 38-43, p. 66, Jan.-Mar. 1999. http://www.cs.berkeley.edu/~kubitron/articles/techreview.pdf "The Internet Reborn"—Wade Roush, Technology Review, Oct. 2003.

Theotokis et al., A Survey of Peer-to-Peer Content Distribution Technologies, ACM Computing Surveys, vol. 36, No. 4, Dec. 2004, pp. 335-371.

Wade Roush, Technology Review, Published by MIT, TR10: Peering into Video's Future, Mar. 12, 2007, http://technologyreview.com/printer_friendly_article.aspx?id=18284.

Coppens et al., Design and Performance of a Self-Organizing Adaptive Content Distribution Network, 2006.

\* cited by examiner

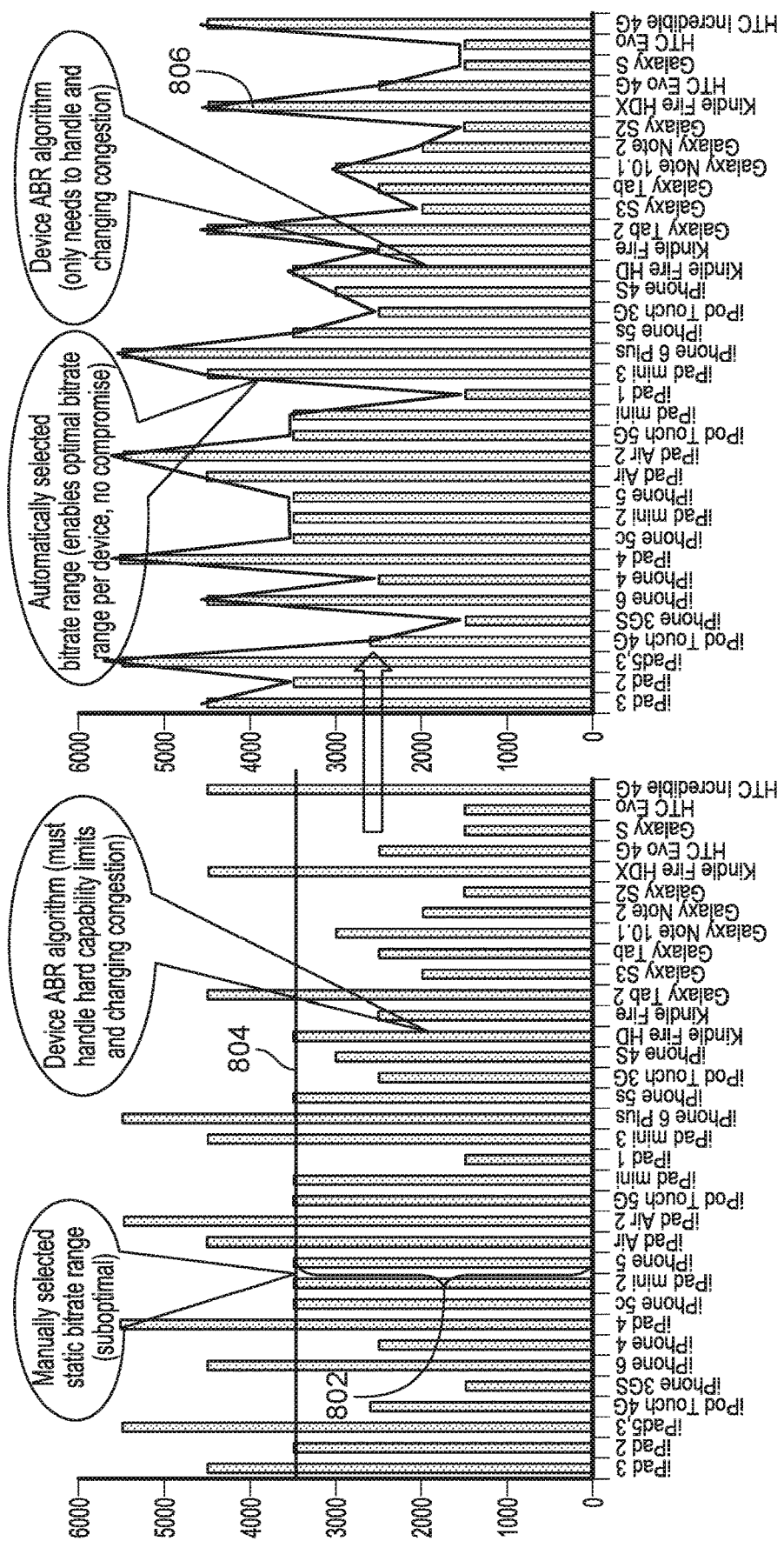

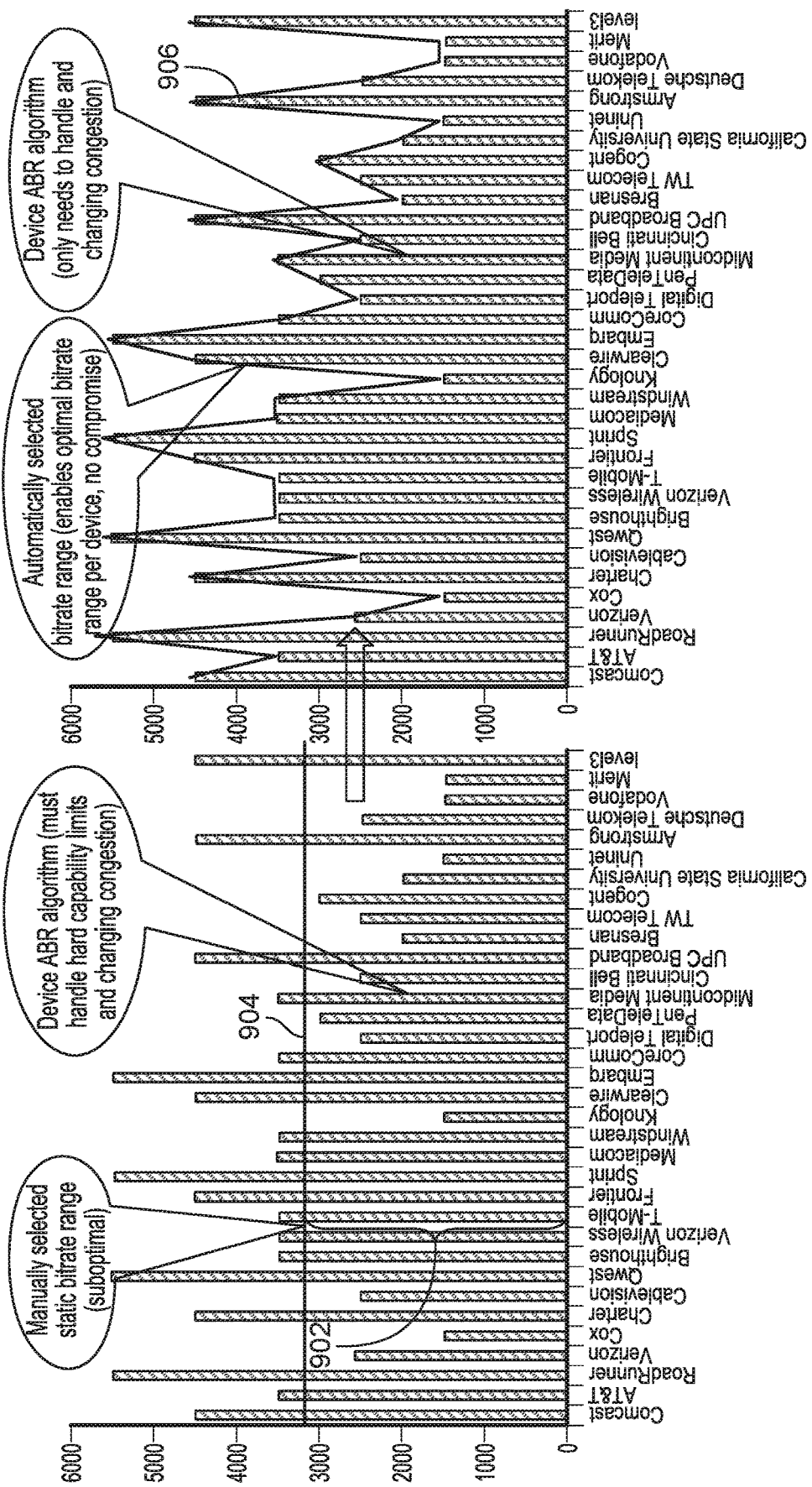

| ISP | Location | Device Model | Content Type |
|---|---|---|---|
| Verizon Wireless | California | iPhone 4S | Live |
| Comcast | New York | iPad 2 | VoD |
| T-Mobile | Florida | Samsung Galaxy S3 | VoD |
| Bright House Networks | Florida | iPhone 6 Plus | Live |
| ... | ... | ... | |

FIG. 10

DYNAMIC BITRATE RANGE SELECTION IN THE CLOUD FOR OPTIMIZED VIDEO STREAMING

CROSS REFERENCE TO OTHER APPLICATIONS

This application is a continuation of co-pending U.S. patent application Ser. No. 14/871,624, now U.S. Pat. No. 10,178,043, entitled DYNAMIC BITRATE RANGE SELECTION IN THE CLOUD FOR OPTIMIZED VIDEO STREAMING filed Sep. 30, 2015 which is incorporated herein by reference for all purposes, which claims priority to U.S. Provisional Application No. 62/089,158 entitled DYNAMIC BITRATE RANGE SELECTION IN THE CLOUD FOR OPTIMIZED VIDEO STREAMING filed Dec. 8, 2014 and to U.S. Provisional Patent Application No. 62/161,790 entitled BITRATE RANGE CONTROL filed May 14, 2015, both of which are incorporated herein by reference for all purposes.

BACKGROUND OF THE INVENTION

Achieving high quality content streaming on the Internet can be challenging. For example, the dynamic nature of networks, as well as the dynamic heterogeneity of the devices used by end-users to access content, can make it difficult to achieve a consistently high quality across the myriad types of devices accessing content on various networks.

BRIEF DESCRIPTION OF THE DRAWINGS

Various embodiments of the invention are disclosed in the following detailed description and the accompanying drawings.

FIG. 8A is an example graph with respect to device model variability.

FIG. 8B is an example graph with respect to device model variability.

FIG. 9A illustrates an example graph with respect to ISP variability.

FIG. 9B illustrates an example graph with respect to ISP variability.

FIG. 10 illustrates an example table including various factors and dimensions.

DETAILED DESCRIPTION

Figure 1A:
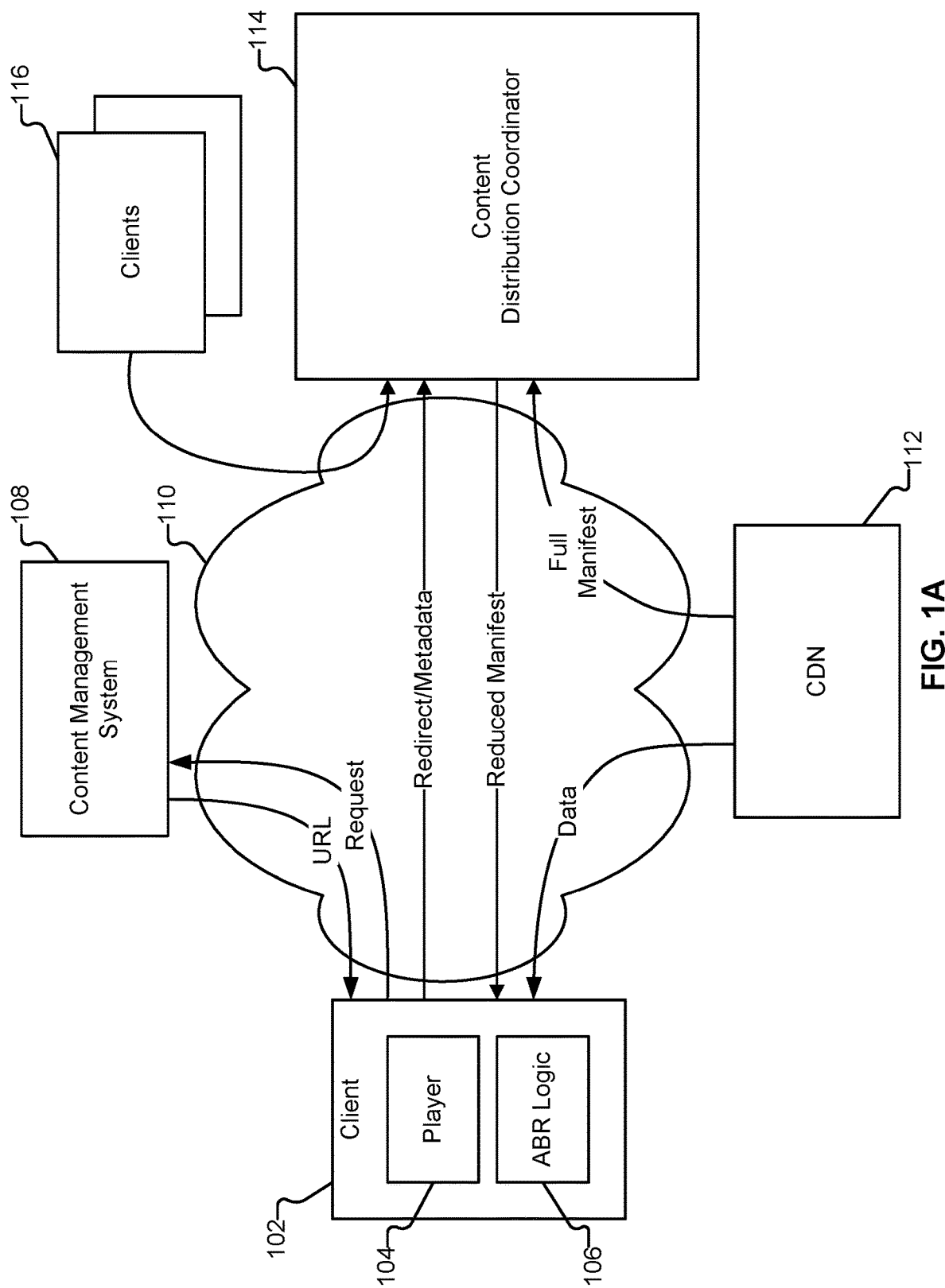
FIG. 1A illustrates an example embodiment of an environment in which dynamic bitrate range selection for optimized video streaming is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In distributing content, client devices are used to access content, such as audiovisual content (e.g., movies, songs, television shows, sporting events, games, images, etc.) that is owned by content owners. Content is stored (or captured) at origin servers, then distributed via other servers, caches, content delivery networks (CDNs), proxies, etc. (collectively, "content sources"). Examples of CDNs include Akamai, Limelight Networks, and Level 3 Communications. Content sources employ a variety of technologies and include HTTP, Adobe Flash Media, and Microsoft Internet Information Service servers.

When requesting content, the client is directed (e.g., by a content management system) to a particular CDN and ultimately to a particular CDN node. The client device then begins streaming content from the CDN node over a network (such as the Internet), which is in turn rendered on the client device (e.g., via a Flash, Silverlight, or HTML5 player if a web browser application is being used). Examples of client devices include personal computers, laptops, cellular phones/personal digital assistants, and other types of information appliances such as set-top boxes, game consoles, smart TVs, broadband routers, file servers, video servers, and digital video recorders, as applicable.

Content may be encoded by publishers in multiple different bitrates or bandwidths. When clients are directed to a CDN to stream content, the CDN provides clients with a manifest file that includes the full superset/list of all available bitrates at which the requested content is encoded. The manifest file that includes the full list of available bitrates is a file that is formatted and includes syntax that is specific to a particular video protocol (e.g., Apple® HTTP Live Streaming (HLS), MPEG-DASH, etc.).

Some clients are configured with adaptive bitrate (ABR) logic to make locally, at the client, a selection of one of the bitrates at which to stream content. Client-side ABR logic is typically configured to make selections (which can change over time) based, for example, on changing network conditions.

In some content distribution solutions, every client is provided the same set/list of available bitrates, which is capped at a maximum bitrate (e.g., that may be set by publishers). Client devices, however, may vary dramatically in processing power and capabilities, where some devices may be constrained in their ability to render content at certain bitrates. For example, older devices with lower performance capabilities may only be able to render content at lower bitrates, while a newer device may have the performance capability to render content at very high bitrates. Additionally, client devices may also operate on networks provided by various Internet Service Providers (ISPs) of different types (e.g., cellular, cable, DSL, etc.) that provide differing levels of bandwidth and network performance, which can constrain the bitrates at which data can be streamed reliably and with high quality.

In an effort to address the vast heterogeneity of device and network capabilities, publishers, in some solutions, are forced to choose a maximum bitrate at which to cap the encoding of content that compromises quality for high performance devices (or ISPs) to ensure that the quality for lower performing devices (and ISPs) is decent and reliable.

However, such compromise can lead to suboptimal selections of bitrates by the ABR logic resident on clients. For example, while existing ABR logic is designed to make a selection based on dynamic changes in a network, the ABR logic operates under the assumption that it can sustain any bitrate that it is provided (where the ABR logic can decide that a bitrate in a provided list cannot be sustained at a certain moment based on dynamic congestion). Without issues in dynamic network congestion, the ABR logic will attempt to play higher and higher bitrates in the list of bitrates the client has been provided, even if the device itself does not have the performance capability to render higher bitrate streams. Thus, low end devices may suffer when attempting to render such bitrate streams, resulting, for example, in stuttering, device overheating, and a poor quality experience for an end-user viewer.

As all clients, regardless of type or network, are provided the same set of available bitrates, the highest bitrate made available (which has been artificially capped) to a high performance device may be lower than what the device is capable of rendering. Thus, the experience for such high end devices is unduly limited, where the end-user is prevented from having a higher quality experience.

Solutions in which all clients are provided the same set of bitrates regardless of device or network capabilities may result in suboptimal streaming decisions that can lead to lower quality streaming experiences and impact user engagement.

Described herein are various techniques for bitrate control, including determining customized, optimal bitrate range selection at a location at least partially remote from the client device. Using the techniques described herein, an optimal set of bitrates that a specific device should utilize can be determined based on factors such as the network that the device is on and the type of the device. Within that determined range (which may be a subset of the full list of available bitrates at which content is encoded), clients can adaptively select whatever bitrate is appropriate at a particular moment in time.

For example, based on knowledge of the specific network that a device is on, and/or the static characteristics of a specific device being used (e.g., type of device, device hardware capabilities (e.g., display resolution, processor speed, etc.)), different clients can be given different ranges of bitrates that are optimally selected/determined based on those characteristics/attributes. As will be described in further detail below, the determination can be automatically made by predicting the optimal bitrate based on data aggregated from multiple clients. The determination of the range can also be manually configured, for example, using policies. Thus, out of a full set of, for example, ten bitrates, a lower performance mobile client can be given only a subset of the four lowest bitrates, while a home set-top box on a high performance home Internet connection can be provided a larger range of bitrates. The different devices then adaptively make selections (e.g., by using the local ABR logic already resident on the devices) from the provided subsets.

As will be described in further detail below, the techniques described herein provide a bitrate range control mechanism that maximizes viewer engagement by aligning the set of bitrates provided to each client device to the capability of a specific device model and the network/ISP to which the device is connected.

While example embodiments in a video streaming (e.g., live and on-demand streaming) ecosystem are described below, the techniques described herein can variously be adapted to accommodate any type of multimedia/audiovisual content distribution, as applicable.

FIG. 1A illustrates an example embodiment of an environment in which remote dynamic bitrate range selection for optimized video streaming is performed.

In the example shown, suppose that a user of client device 102 wishes to watch a video using player application 104. In some embodiments, the player application is a dedicated application. In other embodiments, the player application is provided by a web browser application. The user begins a video streaming session (e.g., by hitting "play" on a selected video). As used herein, a session refers to an entity representing an instance of a user's playback interactions with a content asset. The session may begin with a user's request for a particular content, and end when the user ceases playing the content (e.g., the user stops watching a requested video).

Client 102 also includes adaptive bitrate (ABR) logic 106, which is configured to make a selection of a bitrate from a list of candidate bitrates (e.g., as included in a manifest file) based on factors such as dynamic network congestion during a streaming session. Client device 102 connects to content management system (CMS) 108 (e.g., via one or more networks 110) and requests the content.

In this example, rather than directing the client to a CDN (e.g., CDN 112) to obtain a manifest file, the CMS redirects the client (e.g., via a provided universal resource locator (URL)) to obtain a manifest file from content distribution coordinator (CDC) 114. When the client is redirected to the CDC, the client also provides multidimensional client attribute metadata. The multidimensional client information can include metadata such as device type and network (e.g., ISP). Other examples of multidimensional client metadata will be provided in further detail below. The CDC is also provided an indication of the content to be streamed. The particular CDN node(s) hosting the content may also be provided to the CDN (or the CDC can determine the CDN(s)).

In the example shown, the CDC is configured to communicate with CDN 112. The CDC obtains from CDN 112 a full manifest file that is stored on the CDN that includes the full list/superset of bitrates available for the requested content. The CDC is then configured to perform automated selection of an optimal bitrate range from the full list of bitrates, ensuring that the requesting device, based on its characteristics (e.g., extracted from obtained multidimensional client metadata information), is given an appropriate range of bitrates on session start. The determination can be made based on a prediction using global data aggregated from various clients (e.g., clients 116 as well as client 102) as well as rules dictated/defined by policies (which can be manually configured). Various techniques for making predictions, as well as example policies for use in determining the optimal bitrate ranges, will be described in further detail below.

Based on the determined subset bitrate range, the CDC is then configured to rewrite the original full manifest file, generating a modified/constrained file that includes only the determined subset bitrate range, rather than the full list/superset in the originally/previously obtained manifest file. Generating the modified manifest file includes manipulating, truncating, or otherwise modifying the obtained full manifest file. In some embodiments, rewriting the full manifest file includes modifying the full manifest file by removing the bitrates that are not to be provided to the client. The CDC is configured to process (e.g., parse and rewrite) manifest files corresponding to various video protocols.

The CDC is then configured to provide the reduced manifest file to the client. During the streaming session, ABR logic 106 on client 102 is configured to make bitrate selections using the reduced manifest file provided by the CDC backend. Video data (e.g., video chunks) encoded at the selected bitrate is then obtained from the CDN and rendered for playback on the client.

Alternate Scheme—Client-side Reduction Mechanism

In the above content distribution environment of FIG. 1A, in which a content distribution coordinator obtains and reduces a full manifest file before passing the reduced manifest file to the client, no changes to the client are required.

If the clients can be changed/modified, an example alternate scheme can be used, where the client is configured to locally generate a reduced manifest (rather than receiving a reduced manifest from a backend). Described herein is an example embodiment of such an alternate scheme.

Figure 1B:
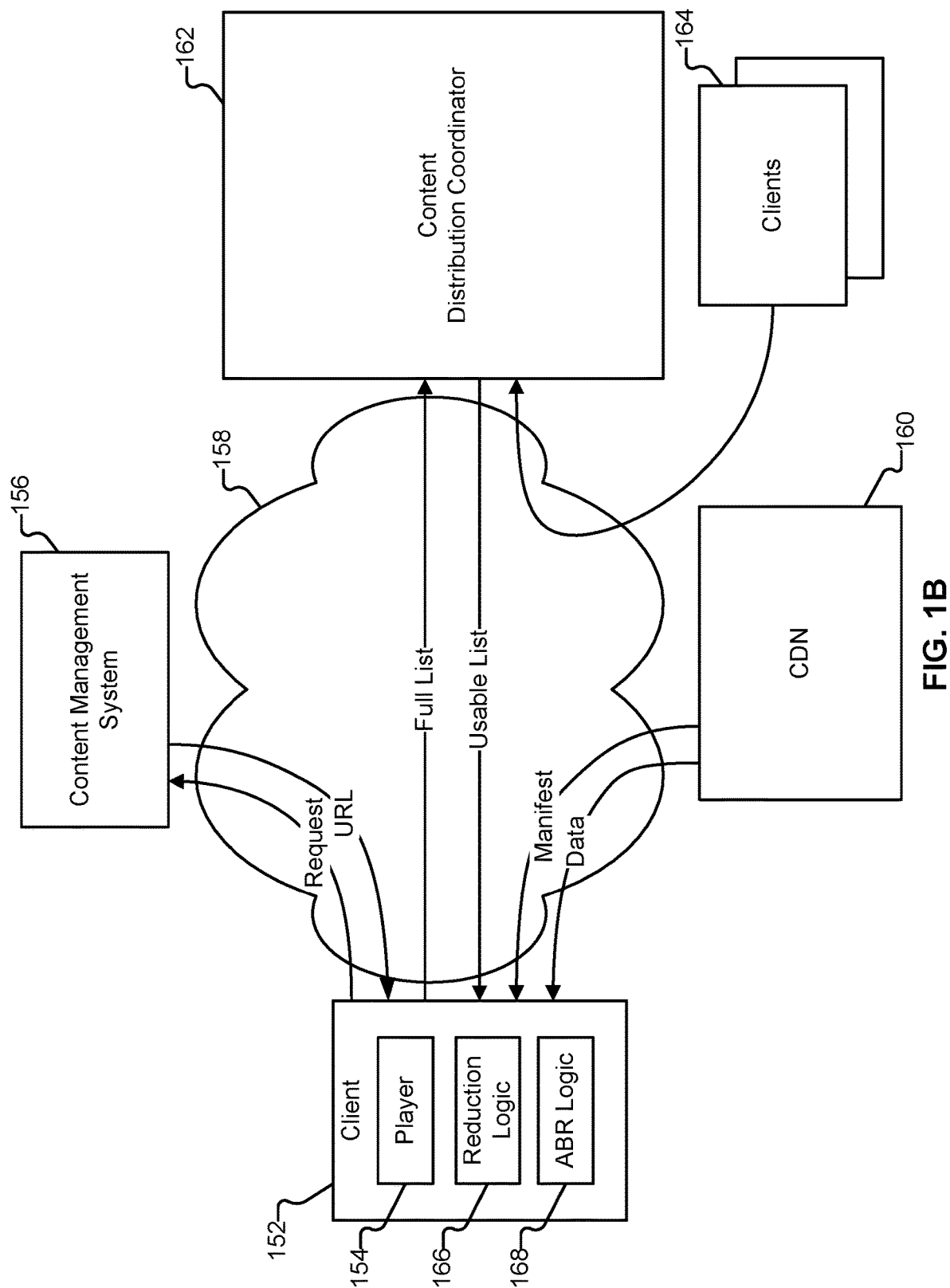
FIG. 1B is an alternate example embodiment of an environment in which dynamic bitrate range selection for optimized video streaming is performed.

FIG. 1B is an alternate example embodiment of an environment in which dynamic bitrate range selection for optimized video streaming is performed. In the example shown, suppose that a user of client device 152 wishes to watch a video using player application 154. The user begins a video streaming session (e.g., by hitting "play" on a selected video). Client device 152 connects to content management system (CMS) 156 (e.g., via one or more networks 158) and requests the content.

In this example, the client, rather than being redirected by the content management system to obtain a manifest file as described in the example environment of FIG. 1A, is directed (e.g., via a provided manifest URL) to a CDN 160 to obtain an original manifest file that includes the full superset of available bitrates.

In the example environment shown, the client includes logic that is then configured to parse the original manifest file to obtain/extract the full superset of available bitrates. The full list of available bitrates is then sent to a content distribution coordinator (CDC) 162. Metadata information associated with the client, such as network (e.g., ISP) and device type, is also provided to the CDC as described above. A custom protocol can be used to communicate data/information between the client and the backend CDC.

The CDC then determines, as described above, what subset bitrate range of the full superset of available bitrates is optimal/usable for the client given its characteristics. As described above in the example environment of FIG. 1A, the bitrate range determination can be made based on global intelligence/shared data aggregated from various clients (e.g., clients 164 and client 152) as well as policies. Instructions can then be sent to the client, which instruct the client to restrict/constrain its pool of candidate bitrates to the subset of bitrates the backend has determined that the client should use. For example, the CDC can send the determined subset as an array/list of usable bitrate values to the client (rather than a manifest file as in the example environment of FIG. 1A).

Upon receiving the usable list of bitrates determined by the backend CDC, the client is configured to use reduction logic 166, which is configured to restrict the usable range of bitrates according to the decision made by the CDC. For example, the client reduction logic can be configured to rewrite the original manifest file (received from CDN 160) according to the subset of bitrates determined and provided by the CDC (i.e., the bitrate range restriction/manifest reduction mechanism is performed locally on the client, rather than on the backend CDC as described above with respect to FIG. 1). Thus, in this example, the backend CDC provides an indication of the bitrate range that the client should use, while the client is configured to locally take the action of reducing the set of bitrates that will be used to stream content (e.g., by reducing a manifest file).

In the above example, the backend CDC provides the client with a list of usable bitrates, which are then used by the client to reduce a manifest file. The list of usable bitrates is derived from the full list of bitrates, and is a subset of the bitrates included in the full list of bitrates. As another example, rather than, or in addition to providing a list of bitrates, the backend CDC provides a threshold bitrate, such as a maximum recommended/suggested bitrate for the client. A set of bitrates that should not be played by the client can also be provided. The local reduction logic then uses the provided bitrate cap and/or set of bitrates to be excluded to determine a usable set of bitrates from a full set of bitrates (e.g., by selecting the bitrates in a full set of bitrates from a manifest file that fall below the threshold bitrate, as well as removing any bitrates that should be excluded, as determined by the CDC). In some embodiments, the instructions provided by the CDC, such as the usable list of bitrates and the threshold bitrate, are determined without requiring the client to provide a full list of usable bitrates (e.g., without having to extract the full set of bitrates from a manifest file and providing the full set to the CDC). For example, the CDC can determine an appropriate threshold bitrate cap and/or a set of bitrates that should not be played by the client, based on the characteristics on the client, without referring to or having knowledge of the full superset of available bitrates specified in a manifest file.

The ABR logic 168 resident on the client then uses the locally rewritten/reduced manifest file when making a bitrate selection during a streaming session. Video data (e.g., video chunks) encoded at the selected bitrate is then obtained from the CDN and rendered for playback on the client.

In some embodiments, a content management system (e.g., content management systems 108 and 156 of FIGS. 1A and 1B, respectively) and a content distribution coordinator (e.g., content distribution coordinators 114 and 162 of FIGS. 1A and 1B, respectively) are operated by the same entity. For example, an online movie streaming service could operate both a content management system and a content distribution coordinator. A content distribution coordinator can also be operated by other entities. For example, a content distribution coordinator can be operated by an operator of a CDN. A content distribution coordinator can operate independently of a content management system and/or independently of a CDN. As one example, the owner of a content distribution coordinator could provide services to multiple content management systems (e.g., that may be associated with different services) and/or multiple CDNs.

As shown in the above examples, clients can be provided an optimal set of bitrate ranges based on their characteristics (e.g., ISP, device type, etc.). By having a backend such as CDC 114 or CDC 162 perform dynamic bitrate range selection, the functionality and intelligence needed to handle device model and ISP network limitations/capabilities can be separated from device-level ABR algorithms, which are designed primarily to handle dynamic congestion. Quality and engagement can then be maximized by eliminating the need to compromise when selecting the full range of bitrates for encoding.

Client

Figure 2B:
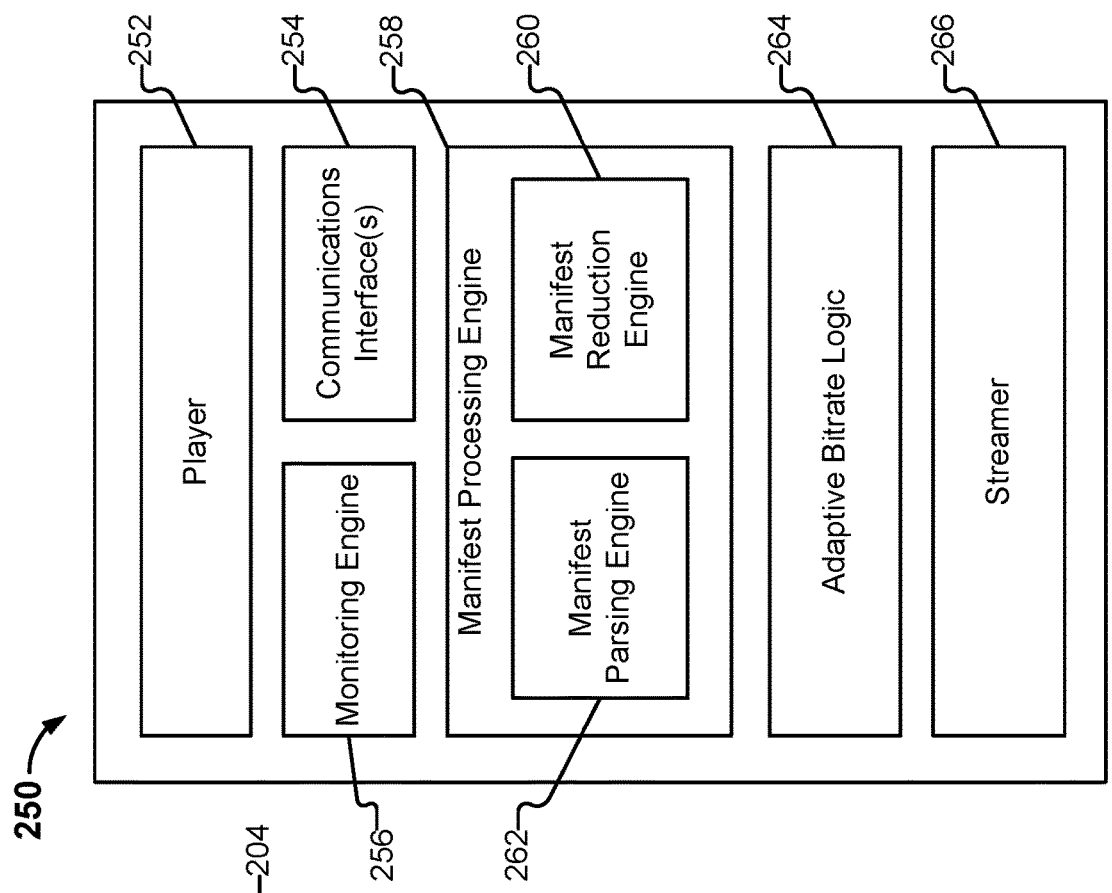
FIG. 2B is a block diagram illustrating an embodiment of a client.
Figure 2A:
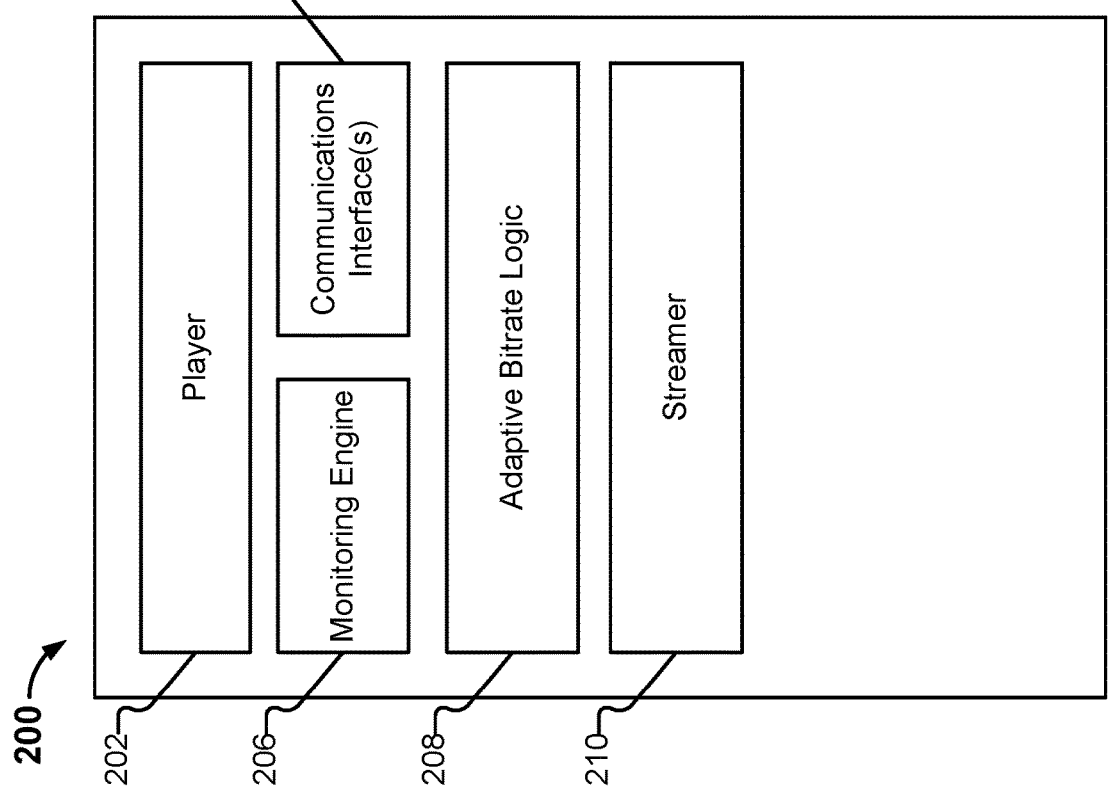
FIG. 2A is a block diagram illustrating an embodiment of a client.

FIG. 2A is a block diagram illustrating an embodiment of a client. In some embodiments, client 200 is an example of client 102 of FIG. 1A. In the example shown, client 200 includes player 202, communications interface 204, monitoring engine 206, adaptive bitrate logic 208, and streamer 210.

Player 202 is a portion of a client device application and is configured to provide controls for controlling playing of a video stream. For example, the player facilitates/supports the controls of a user interface (UI) that an end user interacts with. In some embodiments, the player is a portion of a client application or agent that provides UI controls with which users interact. The player is also configured to render streaming content.

Communications interface(s) 204 is configured to facilitate communication of data/information, over a network such as the Internet, between a client (or player resident on the client, such as player 202) and remote entities, such as content management system 108, CDN 112, and Content Distribution Coordinator 114, in the manner described in FIG. 1A.

Monitoring engine 206 is configured to monitor performance and quality information associated with a client. The information collected by the monitoring engine includes quality metrics. Examples of quality metrics include bitrate, average bitrate (e.g., average bitrate sustained over the lifetime of a session during which a video is played), buffering, failures, startup time (measure of time of how long the content took to start playing), failure events (e.g., failure to start), etc. Another example of a quality metric monitored by the monitoring engine is buffering ratio, which is a metric indicating operating interruptions. For example, the buffering ratio represents a measure of how often (e.g., percentage of time) a stream is being buffered (and interrupted).

Other examples of information collected by the monitoring engine include local state information. The local state information includes current measurements of the client, such as a content player's current bitrate, current CDN, current player state (e.g., playing, buffering, pause, stopped), current player buffer length, current play head time/position, current bandwidth measurement estimations, current frame rate, etc. Other state information can include events such as buffering and error events.

In some embodiments, the quality metrics, performance information, and state information are collected on a per-session basis.

In some embodiments, the monitoring engine is configured to generate summaries of state changes, such as all bitrates played so far during a session (and playing time and buffering time for each one), all the CDNs used so far (and the playing time, buffering time, and errors for each one), sliding window of segment download info (e.g., start time, end time, duration, bytes, etc.), sliding window of average download bandwidth, sliding window of frame rate measurements, as well as other historical information about user interactions (e.g., seeking forward, seeking backward, etc.).

The client is configured to transmit the collected/monitored information, as well as summary information to the CDC (e.g., using communications interface(s) 204) for processing. The quality metrics can be transmitted on a per-session basis. The information can be sent, for example, via heartbeat messages, where, in some embodiments, a "heartbeat" message refers to a package/payload of information that is sent from the client to the backend. As will be described in further detail below, the backend CDC is configured to aggregate the collected quality metrics across multiple dimensions (such as the attributes of a client and a session).

Metadata associated with the client/session is also transmitted with the collected quality metrics (e.g., on a per-session basis). Examples of metadata information include ISP and geo-information (e.g., city, state, country, etc.). Metadata information also includes device information, such as device model, device version, device type (e.g., mobile, set-top box, gaming console, etc.), operating system running on the client device, version of the operating system, etc. The metadata can also include content information, such as the name of the content to be played, the type of the content/asset (e.g., ONDEMAND, LINEAR_LIVE, LIVE_EVENT, etc.), the type of video protocol associated with the content/asset (e.g., HLS, Smooth Streaming, HDS, etc.), streamer type (e.g., Native Android streamer, NexStreaming streamer, etc. for Android; MP MoviePlayer or AV Foundation streamer for iOS, etc.), HTTP user-agent of the content-playing device, custom tags, etc.

Adaptive bitrate logic 208 is configured to select, from a list of bitrates, an appropriate bitrate at which to stream content. In some embodiments, the list of bitrates is provided in the form of a manifest file, which is read by the adaptive bitrate logic. The adaptive bitrate logic is configured to make a selection based on various factors, such as dynamic network changes. In some embodiments, the adaptive bitrate logic operates under the assumption that all of the bitrates that it is provided are playable by a device.

Streamer 210 is configured to stream actual video data. In some embodiments, the streamer is implemented using a set of libraries and code that communicate with and download data (e.g., video chunks) from a content source (e.g., a CDN). In some embodiments, the streamer cooperates with content sources to optimize usage of a streaming buffer.

In some embodiments, if the client is unable to communicate with the backend (e.g., due to network conditions/issues), the client is configured to enter into a failover mode. For example, the client can revert to obtaining a manifest file from a CDN (e.g., where the CMS provides the client with a default URL for obtaining the original manifest file) and using the manifest directly (e.g., without having a rewritten manifest file provided by a CDC). Failover mode can be entered, for example, if no response from a backend (e.g., for a bitrate range or manifest file) is received after a threshold amount of time, or after a threshold number of attempts at communication (e.g., if no response is received from the CDC after a threshold number of heartbeat messages has been transmitted).

In the example of client 200, as described in FIG. 1A, the client does not include logic for reducing the set of bitrates in a manifest file. Rather, the client is configured to obtain manifest files from a backend such as CDC 114 of FIG. 1A. For example, rather than being directed by a CMS to obtain a manifest file from a CDN, the client is provided a URL that redirects the client request for content to a CDC. The client uses the URL (e.g., via communications interface(s) 204) to request a manifest file from the CDC. In some embodiments, multidimensional client attributes associated with the client are also provided from the client to the CDC.

As will be described in further detail below, the CDC is configured to perform the processing of obtaining an original manifest file intended for the client (that includes a full list of available bitrates), and providing a modified manifest file that includes the usable subset of available bitrates determined to be appropriate for the requesting client (based on the attributes of the requesting client). The client then directly uses the provided manifest file, where, for example, from the perspective of the adaptive bitrate logic, the truncated range of bitrates is the complete set of available/candidate bitrates at which content can be obtained. In this example, the client does not have knowledge of the bitrates that were removed from the full superset of bitrates in the original manifest file, and thus will not attempt to select those bitrates which a backend has determined that the client should not attempt to play. In such a scenario, implementation of dynamic bitrate range selection does not require modification to the client.

In some embodiments, as described in the example of FIG. 1B, if a client is able to be configured/modified, the client can be configured with local logic to perform the action of reducing a full set of bitrates to a usable range of bitrates (where the usable range is still determined by a backend such as CDC 162 of FIG. 1B).

FIG. 2B is a block diagram illustrating an embodiment of a client. In some embodiments, client 250 is an example of client 152 of FIG. 1B. In the example shown, client 250 includes player 252, communications interface 254, monitoring engine 256, manifest processing engine 258, adaptive bitrate logic 264, and streamer 266. Manifest processing engine 258 further includes manifest parsing engine 262 and manifest reduction engine 260.

In this example, client 250 includes local logic/mechanisms for reducing a full set of bitrates (e.g., provided in a manifest) to a subset/usable list of bitrates to be used by the client to stream content.

In some embodiments, player 252, communications interface(s) 254, adaptive bitrate logic 264, and streamer 266 are examples of player 202, communications interface(s) 204, adaptive bitrate logic 208, and streamer 210 of FIG. 1A, respectively.

Manifest processing engine 258 is configured to perform processing of manifest files (e.g., obtained from an entity such as a CDN via communications interface(s) 254). Manifest parsing engine 262 of the manifest processing engine 258 is configured to parse obtained manifest files. In some embodiments, parsing obtained manifest files includes reading the manifest files and extracting the full set of available bitrates indicated in the manifest files. The parsed manifest files can include original manifest files obtained from a content management system or CDN as described in the example environment of FIG. 1B. The extracted full list of bitrates is then transmitted to a backend such as CDC 162 of FIG. 1B, for example, via communications interface(s) 254.

As will be described in further detail below, the CDC is configured to evaluate the full set of bitrates and determine a set of instructions which indicates what subset of the full set of bitrates is usable for the requesting client. As described above, the instructions can include an array or list that includes each bitrate which is usable by the client. In other embodiments, the instructions include a threshold bitrate, where all bitrates at or below the threshold are usable by the client. The instructions can also include those bitrates that should be excluded from being played by the client. The reduction mechanism is then configured to evaluate the obtained original manifest and determine which of the individual bitrates specified in the original manifest should be removed based on the received instructions.

Manifest reduction engine 260 of the manifest processing engine 258 is configured to interpret the instructions and reduce the bitrates indicated in an original manifest file accordingly. In some embodiments, bitrate range reduction includes rewriting the manifest file to only include the usable range of bitrates (e.g., by removing the bitrates in the original manifest file that are not usable). In other embodiments, bitrate range reduction includes generating a new manifest file that includes only those bitrates determined by the backend to be appropriate and usable by the client.

The reduced manifest file can then be used (e.g., by the adaptive bitrate logic) when obtaining streaming content, as described above.

In some embodiments, if the client is unable to communicate with the backend (e.g., due to network conditions/issues), the client is configured to enter into a failover mode. For example, the client can revert to using the original manifest file obtained from a CDN directly (e.g., without requesting a bitrate range from a CDC). Failover mode can be entered, for example, if no response from a backend (e.g., for a bitrate range) is received after a threshold amount of time, or after a threshold number of attempts at communication (e.g., if no response is received from the CDC after a threshold number of heartbeat messages has been transmitted).

In contrast to the example of client 200 of FIG. 2A, client 250 includes a local reduction mechanism for modifying a manifest file that is to be provided to the adaptive bitrate logic. The following is an example scenario illustrating how the various components of client device 250 interact with each other. Rather than obtaining an already modified manifest file from a backend such as CDC 162 of FIG. 1B, the client first obtains an original manifest file (e.g., via communications interface(s) 254), for example, from content management system 156 of FIG. 1B. The original manifest file includes a full list/superset of all of the available bitrates at which content is encoded. The client then parses the original manifest file (e.g., using manifest parsing engine 262) to extract the full list of available bitrates. The client is then configured to pass the full list of bitrates parsed from the original manifest file to the CDC, along with the multidimensional client attributes of the requesting client. The CDC is then configured to make a determination as to what subset/range of the full list of available bitrates is usable/appropriate to the client, based on the characteristics of the client. The CDC then provides instructions to the client based on the determination. In some embodiments, the CDC provides, as instructions, a threshold bitrate, which, for example, indicates a maximum usable bitrate for a client, and/or a set of bitrates to be excluded/removed. The resulting usable set of bitrates may be disjoint and non-contiguous. In some embodiments, the instructions provided by the CDC, such as the usable list of bitrates, the threshold bitrate cap, and/or the set of bitrates to be excluded, are determined and provided without requiring the client to provide a full list of usable bitrates (e.g., without extracting the full set of bitrates from a manifest file). For example, the CDC can determine the appropriate threshold bitrate/appropriate set of bitrates based on the characteristics on the client, without referring to or having knowledge of the full superset of available bitrates specified in a manifest file.

Client 250 is then configured to locally modify the original manifest file according to the instructions provided by the CDC (e.g., using manifest reduction engine 260). For example, if a usable list of bitrates is provided, the client is configured to rewrite the original manifest file (or generate a new manifest file) that only includes the usable list/set provided by the CDC. If a threshold bitrate is provided, the client is configured to rewrite the original manifest file (or generate a new manifest file) that only includes bitrates in the original full list/superset in the original manifest file that are at or below the threshold bitrate cap. If a set of bitrates to be excluded is provided, then those bitrates are removed from the manifest file.

The rewritten (or newly generated) manifest file is then provided to the adaptive bitrate logic 264, which is configured to make bitrate selections only from the usable list provided in the rewritten/newly generated manifest file (i.e., the reduction process is transparent to the adaptive bitrate logic, which does not have knowledge of the bitrates that were removed from the full set of bitrates in the original manifest file, and thus will not attempt to select those bitrates which a backend has determined that the client should not attempt to play).

Content Distribution Coordinator

Figure 3:
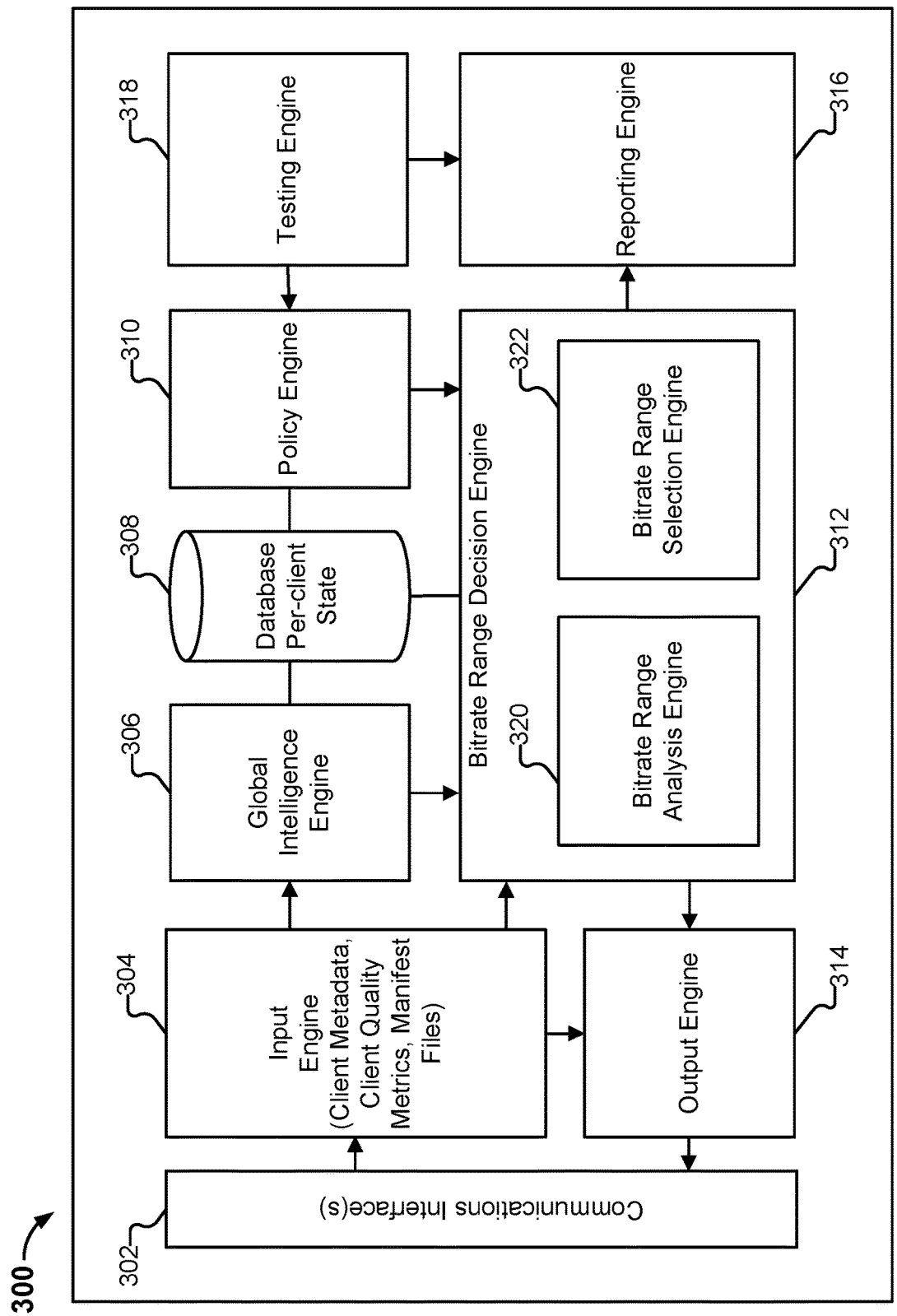
FIG. 3 is a block diagram illustrating an embodiment of a content distribution coordinator.

FIG. 3 is a block diagram illustrating an embodiment of a content distribution coordinator. In some embodiments, content distribution coordinator 300 is an example of content distribution coordinator 114 of FIG. 1A and content distribution coordinator 162 of FIG. 1B. In the example shown, content distribution coordinator 300 includes communications interface(s) 302, input engine 304, global intelligence engine 306, database 308, policy engine 310, bitrate range decision engine 312, output engine 314, reporting engine 316, and testing engine 318. Bitrate range decision engine 312 further includes bitrate range analysis engine 320 and bitrate range selection engine 322.

Communications interface(s) 302 is configured to facilitate communication of data/information between the content distribution coordinator and other entities, such as clients, content management systems, CDNs, etc. over a network such as the Internet.

Input engine 304 is configured to process data received by the content distribution coordinator (e.g., via communications interface(s) 302). One example of information received by the input engine is information received from clients.

An example of such client information is multidimensional client information received from clients such as clients 200 and 250 of FIGS. 2A and 2B, respectively. The multidimensional client information includes information associated with the client, as well as information associated with the session for which content is being requested. In various embodiments, the multidimensional client information includes device model, operating system, operating system version, ISP, geo-location, content type, and content name. As will be described in further detail below, the multidimensional client information can be used by bitrate range decision engine 312 to determine an appropriate range of bitrates to be provided to the requesting client, given its characteristics.

Another example of client information received from clients includes client local state information, as well as performance and quality (e.g., Quality of Experience (QoE)) information, as described above. As will be described in further detail below, the client local state, performance, and quality information can be aggregated/collected/pooled as global shared data and processed by global intelligence engine 306 to generate a global view of performance across nodes.

Another example of information received by the content distribution coordinator includes manifest files, which can be received, for example from CDNs, as described in the example environment of FIG. 1A. As will be described in further detail below, the manifest files associated with content requested by a client can be obtained and processed by the content distribution coordinator to determine what range of bitrates in the superset of bitrates specified in the obtained manifest files is appropriate for a particular requesting client based on its characteristics. As will also be described in further detail below, the obtained manifest files are used as starting points which are modified (or used as templates to create a new manifest file) that include the range of bitrates determined appropriate for a client and/or have those bitrates that are determined to not be appropriate removed.

Another example of information received by the content distribution coordinator includes full lists of bitrates, such as those received from clients as described in the example environment of FIGS. 1B and 1n conjunction with client 250 of FIG. 2B. As will be described in further detail below, the full lists of bitrates are the superset of available bitrates as specified in a manifest file (processed by a client). In some embodiments, the CDC is configured to determine which subset of bitrates in the full list of available bitrates is appropriate candidate bitrates for a requesting client.

Global intelligence engine 306 is configured to generate a global view of performance across nodes (e.g., client players, content sources such as CDN's, etc.). The global view is generated using information aggregated from various clients, content sources, and other nodes in a content distribution environment. For example, data can be extracted/inferred from client heartbeats received from numerous nodes. Data can also be aggregated/captured for nodes by polling various clients and resources for shared event information.

The information can include telemetry/performance information. The global information aggregated from the various client nodes, content sources, etc. can include information related to different bitrates/resolutions of streaming content, etc. In some embodiments, performance and quality metrics collected on clients are aggregated by the global intelligence engine.

As described above, the quality metrics include bitrate, average bitrate sustained during a session, time to start playing (a video during a session), and interruptions (e.g., interruptions due to buffering, as measured according to a buffering ratio). Other information aggregated by the global intelligence engine includes local state information, as described above in conjunction with client 200 of FIG. 2A.

As described above, the performance and quality metrics and local state information are collected on a per-client, per-session basis. In some embodiments, the performance and quality metrics are stored on a per-client basis, where each unique client has a corresponding record (e.g., on database 308) to which information associated with a particular client (e.g., quality metrics) is stored.

The global intelligence engine is configured to process and aggregate the collected information across various dimensions. In some embodiments, the quality metrics and other data collected from clients are aggregated across various attributes and dimensions including client attributes, such as ISP, geo-information (e.g., city, state, country), etc. Other dimensions include device attributes, such as device type, device model, device version, operating system, and operating system version. Another example of a dimension is a streamer type. Per-session quality metrics can also be aggregated across dimensions including content attributes, such as content name, content type (e.g., live or on-demand), etc.

In some embodiments, processing the aggregated information across multiple dimensionalities includes storing (e.g., in database 308) the information in a manner in which it can be broken down across multiple dimensions. For example, sessions/clients can be indexed according to their corresponding metadata, allowing the quality metrics for those sessions/clients to be identified and retrieved. This allows the quality metrics to be accessed and viewed according to various dimensions of interest. For example, quality metrics for sessions involving a certain type of device, certain ISP in a particular region can be obtained.

In some embodiments, the collected and aggregated information is anonymized and stored in a pool of accessible, community global shared data. The global shared data is a knowledge base that is built using the data aggregated across multiple devices and/or sessions. The global shared data can be used to generate a multidimensional map that is updated in real-time as more information is collected from various nodes.

The global intelligence engine is configured to evaluate aggregated data. For example, analytics and statistical processing can be used to determine a global snapshot for all clients being monitored. Metrics and measures associated with different slices of clients and sessions can also be identified from the global information (where the slices are based on the different sets of attributes associated with clients and sessions).

As will be described in further detail below, the global shared data generated by aggregating the information collected from various nodes is used to determine appropriate/optimal bitrate ranges for clients requesting to stream content.

Database 308 is configured to store data. The data stored in the database includes multidimensional global intelligence data as well as policy data. The multidimensional data that is stored is a result of the aggregation and computation of metrics by the global intelligence engine. As described above, the global data is aggregated by the global intelligence engine from numerous clients. In some embodiments, the data collected from the various clients is aggregated into a pool of global shared data and stored, such that sessions and clients with particular attributes/characteristics can be identified/filtered, and the metrics associated with those sessions and clients can be made accessible. In some embodiments, the data stored includes per-client/per-session records. The multidimensional global intelligence data, policy data, and/or per-client/per-session data is evaluated by the global intelligence engine and the bitrate range decision engine in order to determine an appropriate bitrate range to provide a requesting client.

For example, when a request to make a decision for a particular client/session is received by the content distribution coordinator, the attributes (e.g., multidimensional client information) of the particular requesting client can be used to partition/filter the global shared data to identify clients/sessions similar or otherwise correlated to the particular client. For example, the requesting client can be classified by metadata attributes such as ASN, the CDN from which it is receiving data, geographic attributes (e.g., DMZ code, city, or state), device model, device type, ISP, content type, etc. A set of clients/sessions sharing similar attributes (e.g., device model, network, region, and content type) can then be identified. The aggregate quality/performance for the clients in the determined partition can be obtained (as such historical data has been aggregated and been made available by the global intelligence engine, as described above) and used (e.g., by bitrate range decision engine 312, described in further detail below) to determine a usable bitrate range for the requesting client.

The data stored in database 308 further includes policies, which will be described in further detail below.

Policy engine 310 is configured to maintain and enforce policies that define network streaming conditions and parameters. The policies can be manually configured. The policies can be maintained in a data store such as database 308. As will be described in further detail below, policies are considered when the CDC determines how clients are to obtain content and the ranges of bitrates that they should be provided. For example, the rules specified in policies can be used to constrain bitrate ranges based on a variety of conditions, such as ISP, device type, device model, operating system that is running on the device, user characteristics, content type, network congestion, etc. Examples of policy types include network policies, publisher policies, client policies, etc.

A network policy specifies rules such as throughput limits on specific links, aggregate traffic in a given time (e.g., a month or time of day), etc. For example, because evenings are known to be peak times during which networks are more congested, a policy can specify that bitrates for all sessions during such peak times be constrained to a subset of lower bitrate ranges in order to allow more viewers to stream content without buffering during such times.

As another example, a network policy can be used to constrain bitrate ranges based on factors such as geography and/or network ISP. For example, an ISP in one geographical region may have different network characteristics than the same ISP in another geographical region. Thus policies can be specified to have different bitrate range rules/parameters based on the combination of ISP/network.

Policies may be driven based on cost reasons. For example, publishers may not wish to publish a high bitrate to a device if it is not beneficial to the publisher's business, as higher bitrates typically incur higher costs of delivery. Thus, for example, a publisher can specify a policy that indicates that for a particular type of device, bitrates should be limited to a capped bitrate. Such policies, which may be manually configured, are one mechanism that can be used to constrain bitrates, as will be described in further detail below.

The constraints on bitrate specified by a policy may be independent of the ability to deliver content at certain bitrates, or of the capability of devices to render content at certain bitrates. For example, suppose that content has been encoded at up to 7 Mbps. However, for a particular gaming device, it has been found (e.g., based on the analysis of aggregated client data) that bitrates beyond 4 Mbps do not improve user engagement, even though the gaming device is able to render content at higher bitrates without issue.

Given such knowledge, a publisher can specify a publisher business policy that constrains the bitrates at which content is provided to the gaming device to a maximum of 4 Mbps, even though the first device is capable of playing content at higher bitrates, or a network/ISP used by the device is able to support delivery of content at higher bitrates. Thus, using the policy, the publisher can avoid the costs of delivering content at higher bandwidths that do not result in increased user engagement.

The policies can be configured on-demand. For example, suppose that a publisher determines that there is an issue with the encoding of a content item at a particular bitrate. The publisher can specify a policy (or modify an existing policy) on-demand that prevents all devices requesting the content item from being provided the particular bitrate. When the issue with the particular bitrate is resolved, the policy can be modified (or removed) to remove the restriction on the particular bitrate.

Through configuration of policies, entities such as publishers can manually specify constraints on the bitrate ranges that may be provided to clients based, for example, on the attributes of the requesting client/session. As will be described in further detail below, the policies can be used in conjunction with algorithms (described in further detail below) used to determine playable/usable bitrates based on static characteristics, such as device and network capabilities. For example, the policies can be used to impose limits/constraints on the output of the bitrate range analysis algorithms.

In some embodiments, multiple policies can be configured and effective. As will be described in further detail below, when performing a bitrate range decision, the complete list of policies can be evaluated, for example, sequentially and in order, to apply the various rules on what bitrate ranges to apply to a given individual client.

The policies can be stored in a data store such as data store 308. The policies can be indexed according to various dimensions and attributes. Those attributes, such as those included in client/session metadata, can be used to perform a lookup of relevant policies. For example, if a device model is provided as input, all policies associated with the particular device model can be accessed and/or retrieved. Similarly, policies can be indexed and made searchable according to other dimensions, such as ISP, content type, content name, geo-location, etc. (or any combination thereof).

As will be described below, policies can also be configured using the policy engine to facilitate AB testing (e.g., to determine the impact of different bitrates on measures such as user engagement).

Bitrate range decision engine 312 is configured to determine an optimal bitrate range. As will be described in further detail below, the decision of an optimal/usable bitrate range is based on policies (which are manually configured) and/or an evaluation/analysis of data such as global shared data.

Using the techniques described herein, different ranges of bitrates can be determined/defined and provided for different devices/sessions/views based on their attributes/characteristics. As will be described in further detail below, the range to be provided to various clients can be controlled manually, for example, via policies, learned automatically (e.g., using global shared data aggregated from a plurality of clients), or both.

Bitrate range analysis engine (320) is configured to determine optimal bitrate ranges for requesting clients. The optimal bitrate range is determined based on an evaluation/analysis of the data collected from various clients and aggregated (e.g., by the global intelligence engine) across multiple dimensions. In some embodiments, the optimal bitrate range is the range of bitrates that can be reliably played (from a quality and/or performance perspective) by the requesting client. The optimal bitrate range can be defined using various determined values, such as maximum bitrate caps, bitrates to be excluded, quality scores, etc. Examples of algorithms used to determine such values for defining optimal bitrate ranges will be described in further detail below.

In some embodiments, the bitrate range analysis engine obtains data aggregated and stored by the global intelligence engine. For example, using the attributes of a requesting client/session, the global shared data is partitioned to determine the set of clients/sessions similar or otherwise correlated (e.g., having the same set of attributes) to the requesting client/session. The quality metrics and other measures for that partition of clients/sessions are then obtained and used by the analysis engine to facilitate determining a bitrate range that is optimal for the client/session with the particular set of attributes.

As one example, suppose that the analysis engine is configured to evaluate quality metrics according to two dimensions, ISP and client device type. For each unique combination of ISP and client device type, the analysis engine can predict an appropriate bitrate range. For example, for a particular combination of a particular ISP and particular client device type, the analysis engine first obtains the quality metrics associated with sessions played on a device of the particular client device type using the particular ISP. The analysis engine then evaluates the obtained set of quality metrics to determine various measures particular to that combination of ISP and device type, which are used to determine/predict, or are indicative of an optimal bitrate range for clients running on the particular device type using the particular ISP. Any number of dimensions can be considered. For example, four dimensions, ISP, geo-location, device model, and content type, can be considered.

Bitrate Control Algorithms

Various algorithms can be utilized to implement bitrate control, examples of such algorithms are provided in further detail below.

Quality Score:

In some embodiments, for a given combination of attributes/dimensions (e.g., ISP, device model), a measure such as a score that represents the aggregate quality of sessions with that particular combination of attributes is generated. The quality score is then used in turn to determine an optimal range of bitrates to provide, as will be described in further detail below.

As one example, suppose that quality metrics for all sessions on the Comcast ISP in the San Francisco region are gathered. An aggregate quality score for sessions in that particular combination of ISP and region is computed. The quality score indicates an aggregate quality for clients/sessions across the particular ISP/region.

The quality score can then be used to determine/predict an optimal range of bitrates for clients/sessions on the Comcast ISP in the San Francisco region. As one example of a prediction algorithm that uses the quality score, if the aggregate score is low, representing a poor quality, then those sessions on Comcast in San Francisco are provided at constrained (i.e., lower) bitrate ranges. If the aggregate score is high, indicating that quality is very good (e.g., lower buffering interruptions where higher bitrates are able to be streamed), then a larger range of bitrates is provided. Thus, in this example algorithm, higher quality scores lead to larger ranges, while lower quality scores lead to smaller ranges. Other decision algorithms based on an analysis of quality metrics across multiple dimensions can be implemented.

In some embodiments, the quality score is a weighted combination of different metrics, where the weighting of a given metric is based on its significance in contributing to the quality score.

As a numerical example, a computed score can have a minimum value of zero, and a maximum value of one hundred (with a spectrum of scores between), where a zero indicates the lowest quality, and one hundred indicates the highest quality. In one example algorithm, a quality score of zero will result in the lowest bitrate being provided to a client, while a quality score of one hundred will result in all available bitrates being determined as the optimal set of bitrates that the client can reliably play.

As described above, the aggregate score is computed across multiple dimensionalities. In the above example, ISP and geographical region were used. Scores can be computed with respect to other dimensions as well, such as device type, device model, operating system, content type (e.g., live or on-demand video), or any other appropriate metadata associated with client sessions.

In some embodiments, the quality score is dynamically updated over time, for example, as information is collected from clients and aggregated. New quality scores can also be generated for new segments of clients (e.g., for new types of devices, operating systems, ISPs, etc.).

Maximum Bitrate Cap

In some embodiments, a maximum bitrate cap is determined. A maximum bitrate cap can be determined in a variety of manners.

For example, some player implementations are more aggressive in pushing higher bitrates. This may cause issues such as increased buffering and problems with quality of experience when switching up to bitrates that are not sustainable, especially for more volatile networks, such as mobile networks and public WiFi hotspots, and ISP saturation during events such as large, live sporting events online, or even at the homes of some viewers. Described below are examples of algorithms that utilize information of other "similar" views (based on a number of attributes of the views, where a "view," as used herein, refers to a streaming session in which content was/is being viewed), as well as historical data of a viewer's experience and network conditions to identify patterns that are potentially problematic. The use of such algorithms can be used to prevent players from being given higher bitrates such that the issues described above can be avoided.

As will be described in further detail below, various different algorithms can be used, including clustering, classification, and advanced statistical and machine learning algorithms to identify the best, highest bitrates for a particular view at a particular time of play start. The maximum bitrate to be provided to the client can then be capped using the identified best, highest bitrate.

In some embodiments, the algorithms used first classify views based on a number of attributes. Then, for each group, the algorithms calculate the metrics or utility functions based on the highest bitrate played by the view so far, or other per bitrate performance metrics. If there exists a bitrate (or bitrate range) in which the metrics and utility functions are significantly worse (e.g., as measured against a threshold) than the metrics/utility functions of lower bitrate ranges, then those bitrates higher than the bitrate determined to be problematic can be removed.

In some embodiments, the algorithms group all views that are current, in real-time. The algorithms can also group past views, which can be grouped on various different time scales, such as the last one minute, the last five minutes, the last hour, to more sophisticated sliding time scales with considerations such as time of day, day of the week, etc. The algorithms can also group views based on attributes such as content type (e.g., live, video-on-demand (VoD) short, VoD long, etc.), geo information (e.g., country, state, city), network information (e.g., ISP/ASN), connection type (e.g., mobile network, DSL, cable modem, fiber/Coax/enterprise network, public hotspot, etc.), etc. Player information can also be used to group views, for example, based on platforms (e.g., iOS, Android, Web, Samsung TV, Xbox One, PS3, PS4, etc.), operating systems, versions of the operating systems, player versions, player frameworks (e.g., AVFoundation for iOS, NexStreaming for Android, etc.), or any other appropriate player information.

The following are examples of two view groups:

(Live, New York City, N.Y., USA, T-Mobile ISP 4G connection, Samsung S5, NexStreaming Android Framework)

(VoD Short form, Boston, Mass., USA, Comcast Cable Model, PS4, WebMAF Framework)

First Example Algorithm

For each group of views, the highest bitrate played so far is identified. Groups are partitioned based on that highest bitrate played or range of the highest bitrates played (e.g., group by the highest bitrate played so far in the following bucket ranges: <200 Kbps, 200 Kbps-500 Kbps, 500 Kbps-1000 Kbps, 1000 Kbps-1500 Kbps, 1500 Kbps-2000 Kbps, 2000 Kbps-2500 Kbps, 2500 Kbps-3000 Kbps, >3000 Kbps). Performance metrics (e.g., quality metrics such as buffering ratio and average bitrates, engagement metrics such as average play time, content completion rate, etc.) are then calculated for a particular implementation. For example, for each group of views, buffering ratios can be calculated for each of the buckets/ranges.

Below is an example of buffering ratios calculated for each bucket/range for the view group of "Live, New York City, N.Y., USA, T-Mobile ISP 4G Connection, Samsung S5, NexStreaming Android Framework:"

<200 Kbps: 5.5%
[200 Kbps, 500 Kbps): 3.4%
[500 Kbps, 1000 Kbps): 1.8%
[1000 Kbps, 1500 Kbps): 1.2%
[1500 Kbps, 2000 Kbps): 1.2%
[2000 Kbps, 2500 Kbps): 1.0%
[2500 Kbps, 3000 Kbps]: 2.1%
>=3000 Kbps: 2.5%

As shown in the above example, the first two bitrate ranges for this particular view would have high buffering, because the similar views playing on those bitrates are views with bad connections. However, from the analysis, it is determined that the middle set of ranges is associated with a drop in buffering (3.4%→1.8%→1.2%, →1.0%). If, after that drop, there is a bitrate that causes an up tick again in buffering ratio by a non-trivial amount (e.g., a percentage threshold increase such as 30%), the bitrate is indicated as being too high (and should not be provided). In this example, the bitrate of >=2500K results in a buffering ratio more than double that of the buffering ratio of the previous bucket (2.1% vs. 1.0%). Based on this analysis, a decision can be made to avoid bitrates>=2500 Kbps for this group of views.

Second Example Algorithm

In some embodiments, detailed performance information for each bitrate is collected and aggregated. For example, for each bitrate played, the time spent playing content at a given bitrate, or the time spent buffering while playing content at the given bitrate can be collected and aggregated. When such detailed performance information for each bitrate is available, another algorithm can be used to determine a bitrate cap. For example, if a buffering time and playing time for each bitrate is available, the buffering ratio for each bitrate can be calculated (e.g., buffering time/time spent playing). The following are example calculated buffering ratios:

64 Kbps: 8.3%
250 Kbps: 5.1%
450 Kbps: 2.8%
800 Kbps: 1.9%
1400 Kbps: 1.3%
2200 Kbps: 0.9%
3400 Kbps: 1.5%

As shown in the above calculated data, similar to the example scenario shown in algorithm 1, higher bitrates are associated with lower buffering (because there is room to switch down to lower bitrates when there are problems). In this particular example, the buffering experienced at 3400 Kbps exceeds the buffering experienced at 2200 Kbps by a large margin (1.5% vs. 0.9%). Thus, in this example scenario, use of the 3400 Kbps bitrate should be avoided. This is done by setting the bitrate cap at 2200 Kbps.

Third Example Algorithm

Another approach to determine a maximum bitrate cap is based on machine learning algorithms. For example, suppose that there are seven total available bitrates, as in the example scenario of the second algorithm above (64 Kbps, 250 Kbps, 450 Kbps, 800 Kbps, 1400 Kbps, 2200 Kbps, and 3400 Kbps). The algorithm considers caps at two different bitrates, 2200 Kbps (hence removing the 3400 Kbps bitrate), and 1400 Kbps (hence removing the two highest bitrates, 3400 Kbps and 2200 Kbps), as well as considering not having a cap. Thus, there are three choices for the machine learning algorithm to consider (2200 Kbps, 1400 Kbps, no-cap). The machine learning algorithm then uses a small subset of the views (e.g., 2% of total traffic) to seed a uniform random distribution to the three subgroups:

No-cap
Cap at 2200 Kbps (remove 3400 Kbps)
Cap at 1400 Kbps (remove 2200 Kbps and above)

Over time, metrics and utility functions can be calculated for each subgroup. In this example, suppose that average play time is used as a utility function. Suppose that, after time has elapsed, and data (time spent playing) for a sufficient number of sessions (e.g., several hundred sessions) in each subgroup has been collected, the following average play times are calculated for each subgroup:

No-cap: 20 minutes
Cap at 2200 Kbps: 25 minutes
Cap at 1400 Kbps: 22 minutes

Based on the calculated average play times for each subgroup, the algorithm determines that the cap of 2200 Kbps should be selected, as it is associated with the highest average play time. In some embodiments, the performance of each subgroup continues to be monitored. For example, a small percentage of views (e.g., 2%) can be randomly assigned to the three subgroups. Adjustments to the assignment over time can be made based on the utility functions defined here. For example, if later on, because of network changes, the subgroup capped at 1400 Kbps is determined to perform the best, the cap for the overall group of views can be capped to 1400 Kbps during that time.

In some embodiments, the algorithms described above can be modified to perform dynamic classification/segmentation of views based on a number of attributes of the views. For example, in addition to or instead of the static classification of views as described in the algorithm examples above, dynamic classification can also be used. For example, by keeping track of large numbers of metadata attributes, the attributes can be used to finely classify views into fine groups/slices. As finer classification may lead to smaller groups, which might in turn result in less robust metrics or utility function values, in some embodiments, fine groups can be merged into coarser groups. After the groups are defined, algorithms such as the three examples described above can be applied again for subgroups and selection of a bitrate cap.

Removing Mid Bitrates

In some embodiments, rather than, or in addition to, determining a maximum bitrate cap, mid bitrates to be removed are determined. For example, when dealing with a large diversity of platforms, devices, video player frameworks, etc., as well as a large diversity of video encoding and publishing work flows from many different video publishers, there may be times at which some bitrates in the middle of an available set of bitrates cause some performance and quality of experience (QoE) issues for some subgroup of views. For example, a video publisher's iOS player may have issues with a bitrate that had an incorrect encoding profile in the manifest file, causing issues with that bitrate. By removing that bitrate, the performance and user experience for the player is improved. Further, using the techniques described herein, the player does not need to re-learn such an issue for each view.

The following is an example algorithm for determining mid bitrates to remove. Static classification/segmentation of views based on a number of attributes of the views is performed, the attributes including player platform/operating system/framework, network attributes (e.g., of ISP/CDN), video object (e.g., asset ID), etc. For each group, detailed information is collected for each bitrate, including errors that occurred at that bitrate, performance metrics of the bitrates (e.g., buffering ratio specific to this bitrate), other issues with a given bitrate (e.g., the player buffer grows, on average, negatively instead of growing positively or staying steady), the frequency of switching events to and from the bitrate, etc.

As one example scenario, consider the following illustrative example view group:

(Live, New York City, N.Y., USA, T-Mobile ISP 4G connection, Level 3, Samsung S5, NexStreaming Android Framework, Game of Thrones Session 5. Episode 1 (video))

Suppose that a threshold of error count/viewing minutes is set at >0.5/minute, and the following are determined for a set of bitrates:

64 Kbps: 0.1/viewing minute
250 Kbps: 0.05/viewing minute
450 Kbps: 0.3/viewing minute
800 Kbps: 1/viewing minute
1400 Kbps: 0.01/viewing minute
2200 Kbps: 0.1/viewing minute
3400 Kbps: 0.06/viewing minute Given the above error count/viewing minute for the bitrates, calculated from the aggregate collected data, the algorithm determines that the 800 Kbps should be removed, because the average error exceeds the threshold.

In some embodiments, similar to the dynamic classification/segmentation of views described above for determining maximum bitrate caps, dynamic classification of views can also be performed to remove any middle bitrates.

As will be described in further detail below, the results of the algorithms utilized by the bitrate range analysis can be returned and provided (e.g., to bitrate range selection engine 322) as output and used when determining/defining an appropriate bitrate range to provide to a requesting client/session.

In some embodiments, the results returned by the analysis engine are stored. For example, multidimensional tables are generated based on the evaluation of the aggregated information across different dimensions. An example of a multidimensional table is provided below in conjunction with FIGS. 4A-4B. The results of the evaluation are then stored in the table, and provided, for example, as lookup values. For example, a table can be constructed where each row of the table represents a specific combination of attributes/dimensions and a corresponding value. For example, consider a scenario in which sessions/clients are sliced according to four dimensions: ISP, location, device model, and content type. Each row can represent a specific set of values for those four dimensions (representing views with a particular set of attributes). Each of those rows in turn can be associated with a value based on the prediction algorithms described above. For example, each row can have a corresponding quality score, buffering ratio, maximum bitrate cap, bitrates to be removed, etc. In some embodiments, the table includes the optimal bitrate range determined/predicted for each slice of dimensions.

In some embodiments, the table is dynamically updated over time, as new information is collected and aggregated from clients over time (e.g., by the global intelligence system). As new types/slices of sessions and clients are observed (e.g., new types of devices, operating systems, ISPs, etc.), new entries are added to the table, with corresponding new quality scores, predicted maximum bitrate caps, and bitrates-to-be-avoided generated as well. Other data structures besides tables can also be used.

As will be described in further detail below, when a client requests data, a lookup of the tables can be used to define an optimal bitrate range. For example, the attributes/characteristics of the requesting client/session are used as keys to identify an appropriate row in the tables. The corresponding quality score or determined upper-bound bitrate (or set of bitrates) is then used to determine the optimal (based on aggregate, global shared data) bitrate range for the requesting client/session. For example, the quality score is translated into a bitrate range, where higher quality scores result in larger ranges, while lower quality scores result in smaller ranges of bitrates. The upper-bound bitrates are used to set the maximum value of the bitrate range, where bitrates at or below the threshold upper-bound can be provided to requesting clients. If a bitrate to remove is returned, then the bitrate is prevented from being provided to the client.

In some embodiments, the analysis engine is configured to perform analysis of global shared data on demand, for example, in response to a request by a client for content. For example, rather than storing a table and performing a lookup, the bitrate range analysis performs the prediction analysis such as that described above, on-demand. As one example, using the attributes/characteristics of the requesting client/session, the global shared data is partitioned to identify those clients/sessions similar to the requesting client/session. The metrics associated with the identified partition of clients/sessions are then evaluated according to algorithms such as those described above. The results of those algorithms are then used to determine an optimal bitrate range for the requesting client.

Bitrate range selection engine 322 is configured to facilitate dynamic selection of an appropriate, usable bitrate range for a requesting client. The bitrate range selection engine comprises a bitrate control mechanism used to control the bitrate range which requesting clients use to obtain content. As will be described in further detail below, the usable set of bitrates for a requesting client is based on an analysis of global shared data (as described above) and/or the rules specified in relevant policies.

When determining the usable set of bitrates for a client, the selection engine is configured to obtain (e.g., from input engine 304) metadata associated with a client/session, including the attributes and characteristics of the client/session. For example, the selection engine is configured to obtain metadata such as the device model, ISP, geo-location, content type, operating system, etc. associated with the requesting client. In some embodiments, the selection engine obtains the metadata information associated with a requesting client/session that has been extracted by the input engine from heartbeat messages provided by the requesting client. The obtained metadata is then provided to both the bitrate range analysis engine and the policy engine. The results returned by the bitrate range analysis engine and the policy engine are then used together to determine/define an optimal bitrate range, as will be described in further detail below.

The metadata is used by the bitrate range analysis engine to determine, as described above, an optimal bitrate range for the requesting client based on an evaluation of global shared data collected from clients similar or otherwise correlated to the requesting client. As described above, the metadata can be used as a lookup of a table in order to obtain values usable to determine an appropriate bitrate range for the requesting client. In other embodiments, the bitrate range is determined on-demand. As described, various types of results can be obtained from the bitrate range analysis engine, such as threshold bitrates (e.g., upper-bound/maximum bitrates), bitrates to be excluded, quality scores, etc. As will be described in further detail below, the outputs returned by the analysis engine are used (in part) to determine a usable set of bitrates. As will be described in further detail below, the usable set of bitrates can be determined from a full set of bitrates (e.g., extracted from a manifest file or provided by a client).

The metadata sent to the policy engine is used to determine a set of appropriate policies relevant to the requesting client/session. For example, policies corresponding to the various attributes included in the metadata are located and retrieved. As one example, if the metadata under consideration includes device model and ISP metadata information, then policies corresponding to that particular device model and ISP (either individually or in combination) are obtained. For example, if the device is an iPhone 6, then the policy (or policies) with rules specific to the iPhone 6 can be obtained. Similarly, if the device is using the Verizon cellular network, the policy (or policies relevant to the Verizon cellular network) can be obtained.

The results of the global shared data evaluation and the rules specified in the obtained policies identified as relevant to a requesting client are used together, in combination, to select/define a usable bitrate range to provide to the requesting client.

The optimal bitrate range can be defined in a variety of manners.

As one example, the selected bitrate range is determined as a usable list of bitrates for the requesting client. In some embodiments, the usable list of bitrates is determined/refined/derived from a full list of bitrates. The full list of bitrates can be obtained in a variety of ways and includes the full superset of all of the bitrates at which a content item is encoded. For example, as shown in the example of FIG. 1A, in some embodiments, the full list of bitrates is extracted from an original manifest file obtained by the backend (e.g., via input engine 304). As another example, as shown in the example of FIG. 1B, in some embodiments, a full list of bitrates is provided by a client to the backend CDC (where, for example, the client is configured to locally extract the full list of bitrates from an obtained manifest file).

The results of the global shared data evaluation and/or the obtained policies can then be applied to the full list of bitrates to arrive at the usable list of bitrates.

As one example, the full list of bitrates can first be refined according to the results of the evaluation of global shared data. The resulting subset of bitrates can then be further refined using the obtained relevant policies to arrive at the final usable list of bitrates to provide to a client. The results of the global shared data evaluation and the rules specified in the relevant policies can be applied in any appropriate order.

If a quality score is returned based on the evaluation of the global shared data evaluation, then a subset of bitrates in the full list that match to the quality score can be determined. For example, the higher the quality score, the larger the range of bitrates that is acceptable in the full list of bitrates. As one example, suppose that quality scores range from zero to one hundred, with zero indicating the lowest possible quality, and one hundred indicating the highest possible quality. One way that the score can be used is to treat the quality score as a proportion/percentage of the full list. For example, suppose that a score of fifty is determined for a client/session. The quality score of fifty, on the scale of one hundred, can be used to determine that the lower fifty percent of the full set of bitrates is usable for the client. Similarly, if the client receives a score of twenty-five, then the lowest one-fourth of the full set of bitrates is the usable subset of bitrates for the client (based on the analysis of global data). Any appropriate translation/mapping of quality score to bitrate range can be used.

If an upper-bound threshold bitrate is determined/returned based on the global shared data evaluation, then those bitrates in the full list of bitrates that fall at or below the upper-bound threshold bitrate are kept in the usable list of bitrates, while those not in the range are removed.

If a set of bitrates to be avoided is determined based on the global shared data evaluation, than those bitrates in the full list of bitrates that match to the one or more bitrates to be avoided are removed. As the bitrates to be removed may be in the middle of a bitrate range, the resulting subset of bitrates may be disjoint.

In some embodiments, the bitrates determined to be avoided as well as the upper-bound/maximum are both returned by the global shared data evaluation process and used together in combination to refine a full list of bitrates to determine a usable list (e.g., by removing the bitrates that exceed (or are at) the maximum cap and those bitrates that should be excluded based on the global shared data evaluation).

The subset of bitrates determined based on the application of the results of the global shared data evaluation can then be further refined by applying obtained policies. For example, if an obtained policy indicates a constraint/rule such as a bitrate cap, the cap can be applied accordingly to the subset to further limit the bitrate range and arrive at the final usable set of bitrates.

As one example, suppose that based on an evaluation of global shared data, it is determined that for a requesting client with a particular set of attributes, the maximum upper-bound bitrate that should be provided to the requesting client is 7 Mbps. However, a policy for the ISP that the device is on indicates that because the request is being made during a time period of peak traffic, all bitrates should be capped at a maximum of 5 Mbps. By applying the cap imposed by the obtained policy to the upper-bound threshold provided by the analysis of the global shared data, the upper-bound of the usable bitrate range to provide to the client is 5 Mbps.

Multiple policies may be determined to be applicable to a given client/session. For example, suppose that both a device model policy and a network policy are retrieved for a particular client session. The list of bitrates can be evaluated sequentially, in order to arrive at a final set of policy-imposed bitrate constraints, which can in turn be applied to the results of the evaluation of global shared data.

The determined usable range of bitrates need not be contiguous, and can be disjoint. For example, given a full list (as specified in a manifest file) of available bitrates, multiple disjoint subsets of bitrates that are appropriate for a given client/session can be determined as appropriate for the requesting client/session.

For example, it may be determined based on an analysis of aggregated data that while clients with a particular device are able to stream bitrates of up to 10 Mbps without issue, a large number of clients with the particular device have difficulty playing content encoded at 2.5 Mbps (e.g., due to software implementation issues, rather than hardware capabilities of the device). Thus, the 2.5 Mbps can be excluded from being provided to the client. As another example, it may be determined through global shared data analysis that a significant portion of devices, regardless of type, have difficulty playing the same content item at a particular bitrate (e.g., because the publisher's encoding of the content item at that particular bitrate is corrupted). Thus, that particular bitrate for the content item can be prevented from being provided to clients so that the clients will not be able to attempt to play the content item at that particular bitrate.

As described above, the application of both the global shared data evaluation results and the obtained policies is used to determine a usable bitrate list. When determining a usable list of bitrates from a full list of bitrates, the results of the global shared data evaluation and the obtained policies can be applied in any order, or at the same time. For example, the global shared data evaluation and the obtained policies can be applied to each other first, with that result in turn applied to a full list of bitrates. As another example, the policies can be applied first to the full list of bitrates, with the resulting subset then further refined by the results of the global shared data evaluation. As another example, the global shared data evaluation results and the obtained policies can be applied concurrently to a full list of bitrates to obtain the usable list of bitrates.

As will be described in further detail below, the usable list of bitrates determined from the full list of bitrates can then be provided to output engine 314 and used to determine instructions to be provided to the client.

In some embodiments, rather than returning a usable list of bitrates, the bitrate range selection engine is configured to return other types of values that can be used to determine instructions to be provided to the clients.

For example, as described above, an upper-bound of the range of bitrates that a client can play can be predicted (in some cases, irrespective of knowledge of the actual full set of bitrates that are available). If a prediction algorithm as described above determines an upper-bound performance/quality threshold, the rules/constraints specified in obtained policies can be applied to the predicted performance threshold to determine whether the threshold should be further constrained. The resulting threshold based on the combination of global shared data analysis and relevant policies is then the final bitrate cap for the usable bitrate range for the client/session (i.e., all bitrates at or below the threshold are made available to the client). As will be described in further detail below, the single threshold value is then provided to the client. The threshold bitrate is used to control the set of bitrates potentially played by the client to those bitrates at or below the determined threshold.

As another example, a set of bitrates to be excluded is returned by the bitrate range selection engine. For example, the evaluation of the global shared data and/or the obtained relevant policies can specify bitrates to be removed.

In some embodiments, a combination of values usable to define the usable bitrate range for the requesting client is returned by the bitrate range selection engine. For example, a maximum bitrate cap as well as a set of bitrates to be excluded can be returned. As one example, suppose that the upper-bound threshold determined by the evaluation of global shared data is 5 Mbps. The evaluation of global shared data also indicates that there are issues with the 2 Mbps bitrate and thus, it should be excluded. Further, an obtained policy specifies that the 3 Mbps bitrate should not be played, due to encoding issues noticed by the publisher. The three bitrate values can be used to define the acceptable bitrate range for the client, where the client is to be limited to playing only those bitrates that are 5 Mbps or lower, and in addition, is prevented from playing content at the 3 Mbps and 2 Mbps bitrates. As will be described in further detail below, the combination of values (e.g., maximum bitrate cap and bitrates to be excluded) can be returned directly to clients such as those with local reduction mechanisms.

As will be described in further detail below, the various values used to define bitrate ranges, such as the usable list of bitrates, bitrate threshold/cap values, bitrates to be excluded, combinations of bitrate caps/exclusions, etc. are used to determine a set of instructions usable to control the bitrate range which requesting clients use to obtain content.

Output engine 314 is configured to generate a set of instructions to provide to the requesting client. The type of instructions that are generated as well as the manner in which the global shared data evaluation results and obtained policies are utilized to determine a set of instructions are dependent on a variety of factors. For example, the set of instructions that is generated can depend on whether or not the client is configured with local logic to reduce manifest files. The set of instructions that is generated can also depend, for example, on the type of result values obtained from the bitrate range selection engine (e.g., usable list, bitrate cap value, set of bitrates to be excluded, combination of bitrate caps/exclusions, etc.).

For example, if the client does have local logic, a variety of different types of instructions can be provided. For example, as shown in the example environment of FIG. 1B, in some embodiments, a full list of bitrates is provided by a client to the backend CDC. A usable list of bitrates can be generated from the provided full list, using the results of the evaluation of the global shared data and the relevant policies as described above. The usable list is provided directly to the client, for example, in an array or any other appropriate data structure, where the client performs local reduction of a manifest file such that the reduced manifest file includes only those bitrates specified in the usable list provided by the CDC.

Other types of values can also be provided as instructions to the client if it is configured with local reduction logic. For example, the maximum bitrate caps and/or bitrate(s) to be excluded can be transmitted to a remote client as instructions. The local reduction mechanism resident on the client is then configured to locally reduce a full set of bitrates in a manifest file accordingly. For example, the client is configured to exclude those bitrates that exceed the determined threshold (i.e., include only those bitrates that are at or below the cap value), as well as remove any bitrates that the CDC has determined should not be played by the client.

If the client is not configured with a local manifest reduction mechanism (e.g., as described in the example environment of FIG. 10A), then the output engine is configured to reduce an original manifest (or generate a new manifest file). The modified (or new) manifest file is then provided to the client.

In some embodiments, the usable list determined by the bitrate range selection engine is used to perform manifest reduction. For example, as the usable list was derived from the full list included in the manifest file obtained by the CDC, the obtained manifest file is modified such that the bitrates in the full list that are not in the determined usable list are removed. The output engine is configured to handle manifest files for various types of protocols, which may have differing syntax and format. The output engine is configured to provide a manifest file that is in the appropriate format for the requesting client device (e.g., based on metadata from the client, such as video protocol to be used).

If instead of a usable list, a maximum bitrate cap and/or a set of bitrates to be excluded are returned by the bitrate range selection engine to the output engine, then the manifest file is rewritten such that the superset of bitrates indicated in the manifest file is filtered/refined according to those bitrate cap/excluded values.

As described above, the range of bitrates to be provided to a client can be controlled manually, for example, via the configuration of policies and/or automatically learned over time, for example, based on an evaluation of aggregate, global shared data.

Reporting engine 316 is configured to facilitate reporting. Various types of reporting are provided. For example, the reporting can include summary reports regarding the bitrate range decisions made for various clients/attributes. The summary reports can be viewable across different dimensions, for example, to view decisions made for different slices of clients and sessions. In some embodiments, visualizations (which can be interactive) of the decisions can be generated. An example of a visual representation of bitrate range decisions is shown in conjunction with FIG. 11. In some embodiments, the summary reports are generated using information generated by the global intelligence engine and/or the bitrate range analysis engine.

In some embodiments, the reporting engine is configured to provide reports associated with experiments and tests (e.g., A/B testing) performed (e.g., using testing engine 318). Further details regarding A/B testing and the type of information that can be reported are described in further detail below.

In some embodiments, the reporting engine is configured to provide recommendations and inferences based on the bitrate range decisions. For example, based on statistical analyses (e.g., performed by the bitrate range analysis engine) of quality metrics with respect to played bitrates, recommendations as to whether to attempt to introduce higher bitrates can be made. As another example, inferences can be made as to whether a network is capable of handling certain bitrates. As another example, inferences can be made that there are issues with certain bitrates (e.g., based on an observation that clients/sessions playing the certain bitrates have poor quality). Further examples of recommendations and inferences will be provided in further detail below.

The recommendations/inferences can also be made based on an analysis of the results of experimentation/testing. For example, if a publisher performed A/B testing to determine whether a new higher bitrate should be added, the reporting engine can perform statistical analysis of the higher bitrate to determine its impact on user engagement. If, for example, the higher bitrate resulted in a significant, measurable increase in user engagement (e.g., that exceeds a threshold), the reporting engine can recommend that the bitrates at which content is encoded be increased.

In some embodiments, the reporting engine is configured to provide alerts/notifications. For example, if it is inferred from data analyses that a broad swath of clients are having issues with playing content encoded at a particular bitrate, the publisher can be notified with an alert indicating that there may be an issue with the particular bitrate. Similarly, if the issue with playback of the particular bitrate is determined to be limited to a particular type of device, the manufacturer of the device can be notified of the issue (e.g., that there may be a firmware issue that prevents the device type from reliably playing the particular bitrate).

Testing engine 318 is configured to facilitate experimentation. As will be described in further detail below, using the bitrate control techniques described herein, testing such as AB testing to determine the impact of bitrates on metrics such as user engagement can be performed. In some embodiments, the testing engine communicates with the policy engine, where policies can be configured that define the parameters of the experiments to be performed.

Content distribution coordinator 300 is illustrated as a single logical device in FIG. 3. In some embodiments, content distribution coordinator 300 comprises standard commercially available server hardware (e.g., a multi-core processor, 4+Gigabytes of RAM, and one or more Gigabit network interface adapters) and runs typical server-class operating systems (e.g., Linux), as well as Java HTTP server software stack. Content distribution coordinator 300 can also be implemented using a scalable, elastic architecture and may comprise several distributed components, including components provided by one or more third parties. Further, when content distribution coordinator 300 is referred to herein as performing a task, such as storing data or processing data, it is to be understood that a sub-component or multiple sub-components of content distribution coordinator 300 (whether individually or in cooperation with third party components) may cooperate to perform that task.

Figure 4A:
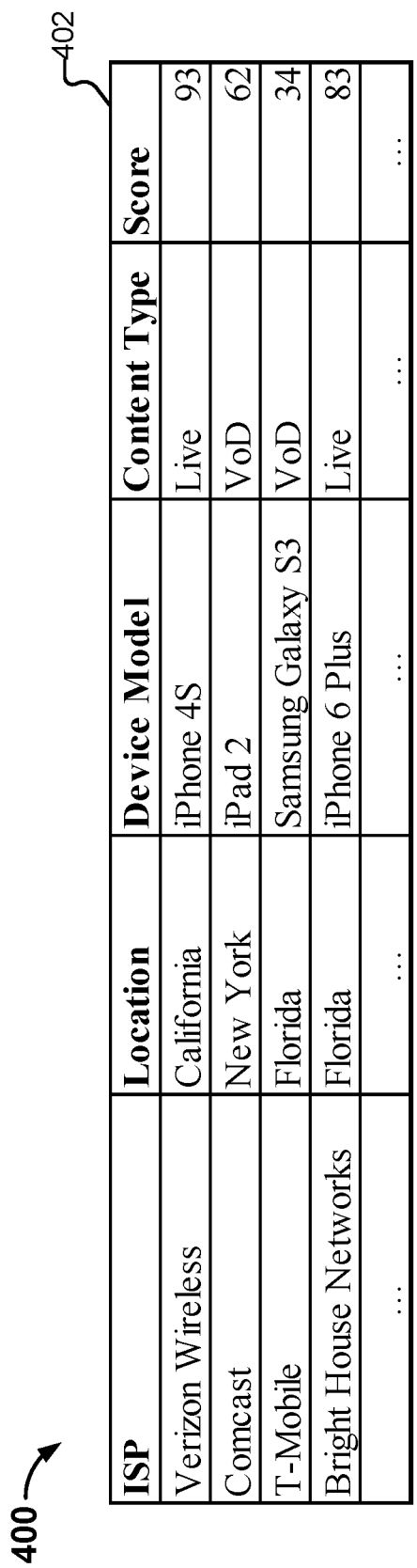
FIG. 4A illustrates an example of a multidimensional table.

FIG. 4A is an example of a multidimensional table. In this example, table 400 is a four-dimensional table, where the four dimensions include Internet Service Provider (ISP), location, device model, and content type. As shown, each row of the table corresponds to a different combination of values for those four dimensions. At 402, quality scores (e.g., determined by bitrate range analysis engine 320 of FIG. 3) for each row are shown.

Figure 4B:
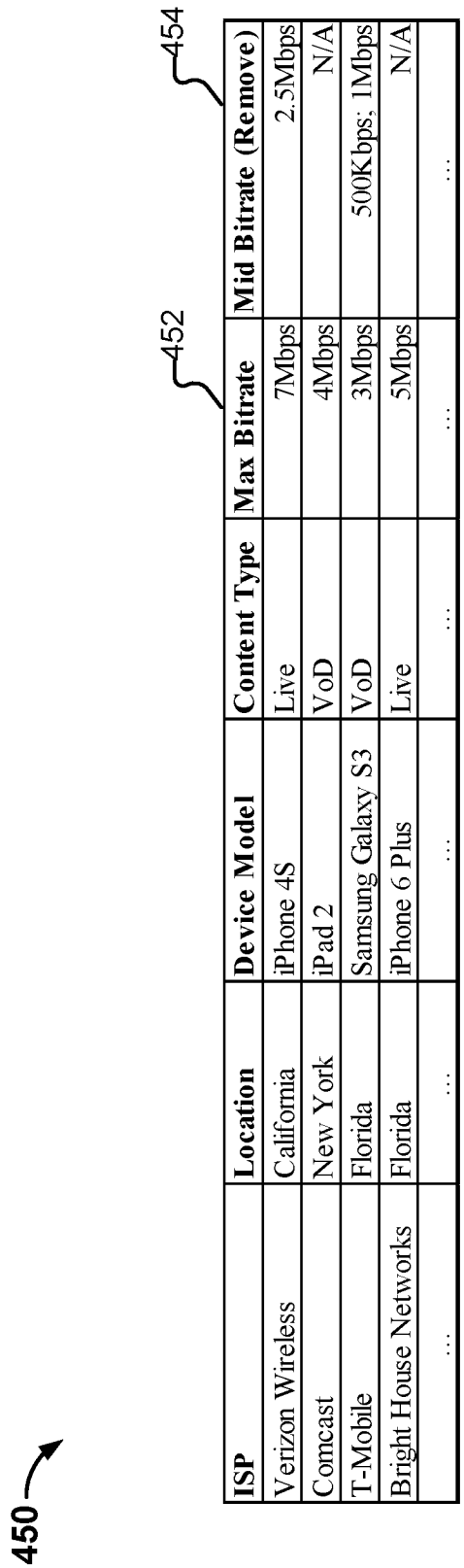
FIG. 4B illustrates an example of a multidimensional table.

FIG. 4B is an example of a multidimensional table. In this example, table 450 is a four-dimensional table, as shown in the example of FIG. 4A. In this example, at 452, a column of values corresponding to the highest sustainable bitrate (e.g., without buffering ratio exceeding a threshold level) determined for each row is shown. At 454, a column of values corresponding to one or more bitrates to remove (e.g., based on whether a threshold number of errors is exceeded) is shown. In some embodiments, the bitrate cap and mid bitrates to remove are determined by bitrate range analysis engine 320 of FIG. 3.

Figure 5:
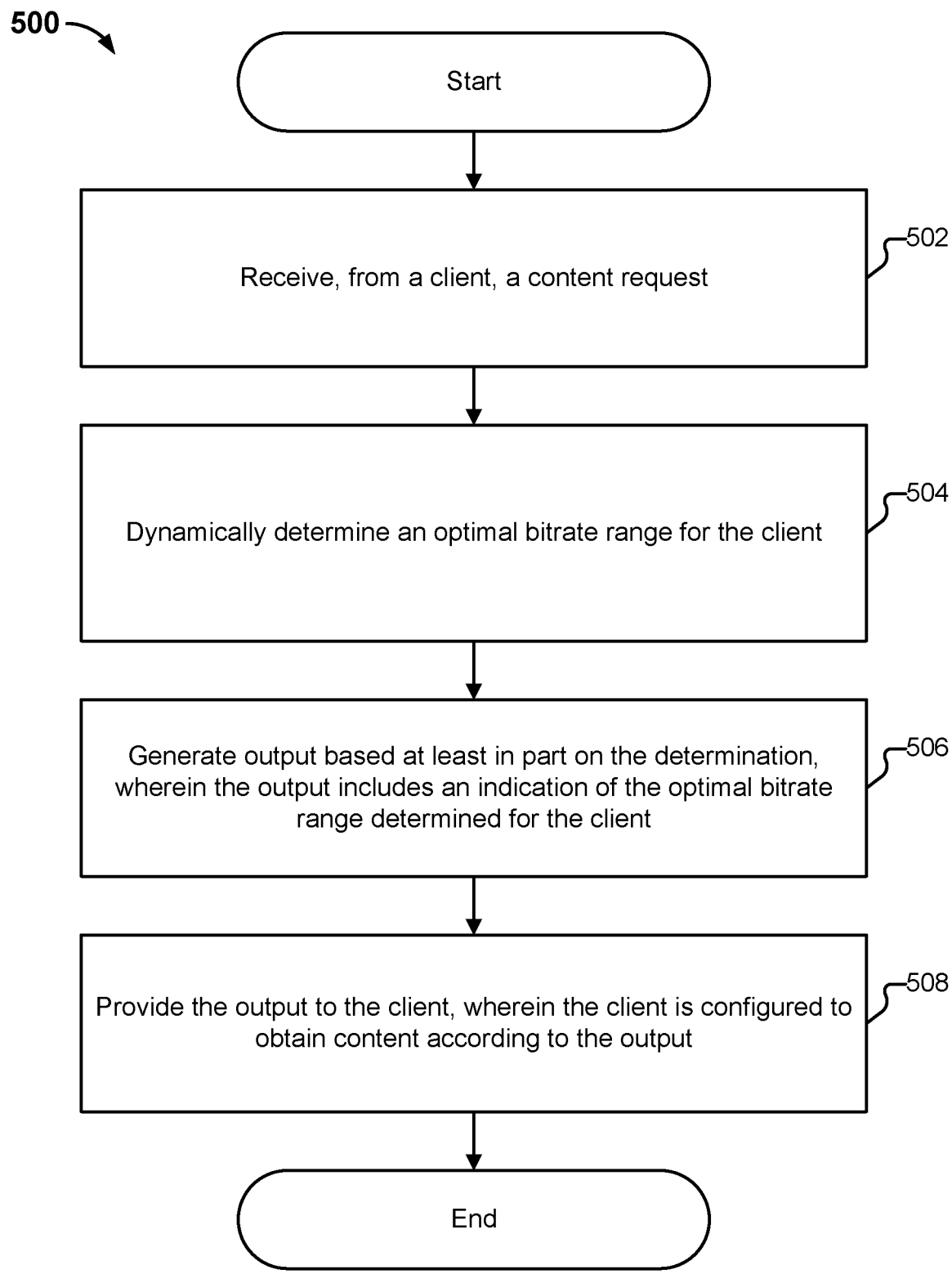
FIG. 5 is a flow diagram illustrating an embodiment of a process for selecting a bitrate range.

FIG. 5 is a flow diagram illustrating an embodiment of a process for selecting a bitrate range. In some embodiments, process 500 is executed by content distribution coordinator 300 of FIG. 3. The process begins at 502 when a content request is received. In some embodiments, metadata associated with the client is also received. The metadata information includes an indication of a client device type and a network associated with the client. Other examples of metadata include geo-location, content type, operating system, etc.

At 504 an optimal bitrate range is determined for the client. In some embodiments, the bitrate range is dynamically determined, on-demand, in response to the client's request. The bitrate range can be determined on a per-session basis, for example, at the beginning of a video streaming session.

The optimal bitrate range is determined based at least in part on the received client metadata. The optimal bitrate range can also be determined based on an evaluation of quality metrics (e.g., real-time quality metrics). The quality metrics can be associated with the client and/or associated with similar clients (e.g., obtained from global shared data). The optimal bitrate range can also be determined based on a set of one or more policies.

In some embodiments, global shared data includes data aggregated from multiple clients. The data can include real-time performance data as well as quality metrics associated with client sessions. In some embodiments, the evaluation of global shared data is performed across different slices of client metadata attributes.

For example, an evaluation of clients and sessions can be made based on the attributes of device type and network (e.g., ISP). Different bitrate ranges can be provided for different combinations of device type and network. For example, bitrate ranges can be separately determined for iPhone 6's on the Verizon network and iPhone 6's on the AT&T network. Thus, different bitrates/subset of bitrate ranges may be determined as optimal for different clients.

In some embodiments, performing the evaluation of global shared data includes obtaining the quality metrics associated with clients/sessions similar to or otherwise correlated with the requesting client/session. The correlated clients/sessions are those clients/sessions with the same set of attributes (e.g., device model and ISP) as the requesting client/session. The quality metrics associated with the partition of similar clients are then evaluated to facilitate determination of a bitrate range.

As one example, a quality score is determined for the group of clients/sessions with the particular set of attributes/dimensions of interest. In some embodiments, the quality score indicates a measure of the quality of the client/session based on its attributes. The determined quality score can then be mapped to a range of bitrates. As one example, higher scores map to larger ranges of bitrates, while lower scores map to smaller ranges of bitrates.

In some embodiments, rather than or in addition to generating a quality score for the group of similar/correlated clients, the global shared data is evaluated to predict a bitrate range based on observed client/session performance/quality. As described above, various types of values used to define the bitrate range can be determined using a variety of algorithms. For example, a maximum bitrate cap and/or a set of bitrates to be excluded is determined. As described above, information of similar views (e.g., other sessions that share/have matching attributes with the requesting client/session), as well as historical data of a viewer's experience and network conditions can be used to identify patterns that are potentially problematic.

For example, the algorithms (e.g., as utilized by bitrate range analysis engine 320 of FIG. 3) classify requesting clients/sessions/views based on a number of attributes, such as the received client metadata information described above (e.g., device model, ISP, geo-location, content type, etc.). Dynamic classification, as described above, can also be performed. The algorithms then calculate metrics or utility functions based on data such as the highest bitrates played by similar views so far, as well as other performance metrics, such as the quality metrics (e.g., buffering ratio, average bitrates, etc.) as well as engagement metrics (e.g., average play time, completion rate, etc.). The metrics and utility functions are then used to determine maximum bitrate caps and/or bitrates (including middle bitrates) to be excluded/removed. Thus, the players are prevented from being given higher bitrates and/or middle bitrates that are problematic/causing issues (e.g., in quality or performance).

The evaluations of the global data can be updated over time. For example, the evaluations can be performed as a batch process, periodically, dynamically, on-demand, etc. For example, the evaluations can be updated as new data is collected from clients, new device models and ISPs are encountered, etc.

In some embodiments, the results of the evaluation of the global data are stored. For example, the results are stored to multidimensional tables, where the tables store, for a set of dimensions/attributes, quality scores, predicted bitrates, etc. for each combination of attribute/dimension values. For example, each combination of device model and ISP (e.g., (iPhone 6, Verizon), (Samsung Galaxy S6, Verizon), (iPhone 6, AT&T), etc.) can be associated with a corresponding determined quality score and/or predicted bitrate.

When a request for a manifest file or bitrate range is received, the values stored in the multidimensional tables are retrieved. For example, a lookup of the multidimensional tables using the attributes and characteristics of the requesting client/session as keys to the multidimensional tables is performed. The corresponding values, such as quality scores and predicted upper-bound thresholds are then returned and used to determine an optimal bitrate range. In some embodiments, rather than retrieving the values from tables, the values are determined on-demand in response to a client/session request.

In some embodiments, policies include specifications of rules governing what bitrates are appropriate to provide to a requesting client. The policies can be applicable based on a variety of factors, such as device model and network. For example, a policy can be specified that includes constraints on the bitrates to be played on a particular device. As one example, a publisher can configure a policy that specifies that all clients using a particular type of gaming device are to be limited to playing a maximum bitrate of 5 Mbps. As another example, an ISP can specify a policy defining constraints on what bitrates are to be played at different times of day. For example, during peak hours, the policy may limit bitrates for all clients, regardless of type, to 3 Mbps. During off-peak hours, the limits are removed. The limits may be specified for a variety of reasons, such as on a cost-driven basis (e.g., as delivering higher bitrates typically incurs higher costs) and network considerations (e.g., congestion), and may be specified irrespective of the capabilities of a device When determining an optimal bitrate range, policies relevant to a client/session are obtained. For example, the attributes of the client/session, such as its corresponding device model and ISP are used to obtain appropriate policies. Multiple policies may be obtained.

In some embodiments, the final optimal bitrate range to provide to a requesting client is selected based on a combination of the global shared data evaluation (e.g., of real-time quality measures) as well as the rules specified in the policies. For example, the results of the prediction algorithms and the rules specified in the policies are applied together to determine the optimal bitrate range (or determine values to define the optimal bitrate range). If multiple policies are obtained, the policies are applied to each other sequentially (and in order, if such priority is defined).

Various types of bitrate ranges can be determined/defined. One example is a value defining upper-bound of the bitrate range (i.e., maximum bitrate cap) that can be reliably played by the requesting client.

For example, if a device policy constrains a particular device model to a maximum bitrate of 7 Mbps, and a separate ISP policy constrains the maximum bitrate to 5 Mbps, then the policy-specified bitrate range is 5 Mbps. The policy-specified bitrate range is applied to the results of the global shared data evaluation to determine an optimal bitrate range. For example, suppose that the predicted upper-bound bitrate (based on observations of sustainable bitrates, or an analysis of bitrate versus interrupts) for the combination of device model and network of the requesting client is 6 Mbps. The 6 Mbps bitrate range from the global shared data evaluation is combined with the 5 Mbps policy-specified bitrate range to arrive at a final bitrate range with a maximum bitrate of 5 Mbps. In this example, the maximum bitrate range was determined as the minimum of the upper-bound thresholds determined by the evaluation of global shared data and the rules specified by the obtained relevant policies.

Another example way to define a bitrate range is by determining those bitrates (including middle bitrates) that should be removed. Removal of such middle bitrates results in the disjoint bitrate ranges.

Another example way in which a bitrate range is defined is through a usable list/set of bitrates which the client is determined to be capable of reliably playing. The usable set of bitrates can be determined from a full set of available (e.g., candidate) bitrates (where the usable set is a subset of the full set). In some embodiments, the full set of available bitrates is extracted from an obtained original manifest file, which includes the superset of all available bitrates at which a requested content item is encoded. In some embodiments, the full set of available bitrates is obtained as a list, from a client, which is configured to perform the parsing of a manifest file to extract the full list of bitrates, which are then provided to a backend such as CDC 300 for processing.

The usable list of bitrates is determined by applying the results of the evaluation of global shared data and/or the rules specified in the policies determined to be relevant to the requesting client/session to the full list/set of bitrates.

The results of the global shared data evaluation can be applied, for example, as follows. A quality score corresponding to the attributes of the requesting client/session is obtained. The quality score can be obtained by performing a lookup of a multidimensional table, as described above. In some embodiments, the quality score is determined on-demand. The quality score is then mapped to a subset of the full set of bitrates. For example, suppose that the quality score is measured on a range of zero to one hundred, with zero indicating the worst quality, and one hundred indicating the best quality. One example of a mapping between the quality score and the full set of bitrates is that the higher the quality score, the larger the range of bitrates in the full set that the client is determined to be able to reliably play (i.e., higher scores translate to higher playable bitrates). The lower the score, the smaller the range of bitrates that the client is determined to be able to reliably play (i.e., lower scores translate to lower playable bitrates).

If a threshold bitrate is provided as a result of the global shared data evaluation (e.g., generated by prediction algorithms as described above), then the threshold bitrate can be applied to the full set as follows. The threshold bitrate is treated as the maximum, upper-bound of the bitrates that the requesting client can reliably play. The bitrates in the full set that exceed the threshold are removed, with the remaining bitrates (i.e., those that are at or below the threshold) forming the usable set of bitrates that the requesting client can reliably play.

If a set of bitrates to be excluded is provided as a result of the global shared data evaluation, then those bitrates in the full set matching to the bitrates to be excluded are removed. In some embodiments, both the maximum bitrate cap and the set of bitrates to be removed are used to reduce a full set of bitrates.

The one or more policies are also applied to the full list of bitrates. For example, any constraints such as bitrate caps can be used to filter the full list of bitrates (i.e., removing any that fall beyond the bitrate cap). As another example, if a policy specifies a particular bitrate to be excluded, the bitrate can be removed from the full list/set of bitrates. If multiple policies are obtained, then the policies can be applied sequentially (or in order, if such order is defined).

The combined application of the results of the evaluation of global shared data and the rules specified in the policies is used to determine the final, optimal bitrate range for the requesting client. The global shared data evaluation results and the policy rules can be applied to the full list in any order or appropriate manner. The evaluation results and the policy rules can be applied to each other before being applied to the full list as well.

At 506, output is generated based at least in part on the determination. The output includes an indication of the optimal bitrate range determined for the client. In some embodiments, the type of output generated is based on the functionality of the client.

For example, if the client is requesting a manifest file, and does not have a mechanism by which to reduce a manifest file to only include the determined bitrate range, then a manifest file is generated. In some embodiments, generating the manifest file includes reducing an original manifest file. As described above, an original manifest file that includes the full set of available bitrates at which content is encoded is obtained (e.g., from a CDN). A usable list of bitrates which can be reliably played by the requesting client is generated from the full list of bitrates extracted from the original manifest file. The original manifest file is reduced to only include those bitrates in the determined usable list. For example, those bitrates in the full set that are not included in the usable list are removed from the original manifest file. In some embodiments, a new manifest file that includes only those bitrates in the determined usable list is generated. The reduced (or new) manifest file including only the determined usable list of bitrates is provided as output to the requesting client.

If the client does include a mechanism/logic for reducing manifest files, a variety of different types of outputs can be generated. As one example, if the requesting client provided a full list of bitrates (e.g., as described in the example of FIG. 1B), a usable list of bitrates as described above is returned as output to the client. The usable list can be sent, for example, as an array that includes the usable bitrates that the client has been determined to be able to reliably play. The client is configured to use its local manifest reduction mechanism to locally reduce an obtained manifest file according to the usable list of bitrates.

As another example, rather than outputting a usable list of bitrates, a value, such as a maximum bitrate, is provided. As described above, based on the evaluation of global shared data and the rules specified in relevant policies, a maximum bitrate is determined that indicates the upper-bound of the range of bitrates that the requesting client has been determined to be capable of reliably playing. The client is configured, using the local manifest reduction, to reduce an original manifest file according to the maximum bitrate range (e.g., by removing those bitrates in the full set of bitrates that exceed the maximum threshold bitrate range).

Other types of outputs such as combinations of bitrates (e.g., an upper-bound bitrate along with a set of bitrates to be excluded) can be provided to the client, which is in turn configured to use the output to locally reduce a manifest file.

As shown, the type of output to be generated for and provided to the client is based on the type of request that is received. For example, if the client requests a manifest file, as described in the example environment of FIG. 1A, then a manifest file is provided. If the client, however, indicates that it is equipped with a local reduction mechanism and requests instructions for a set of one or more values (e.g., usable list of bitrates or bitrate cap and/or excluded bitrates), then values such as a threshold bitrate or a usable list of bitrates are provided as output. At 508, the generated output is provided to the client. The client is configured to obtain content according to the generated output (e.g., select bitrates at which to obtain content based on the indicated optimal bitrate range).

Figure 6A:
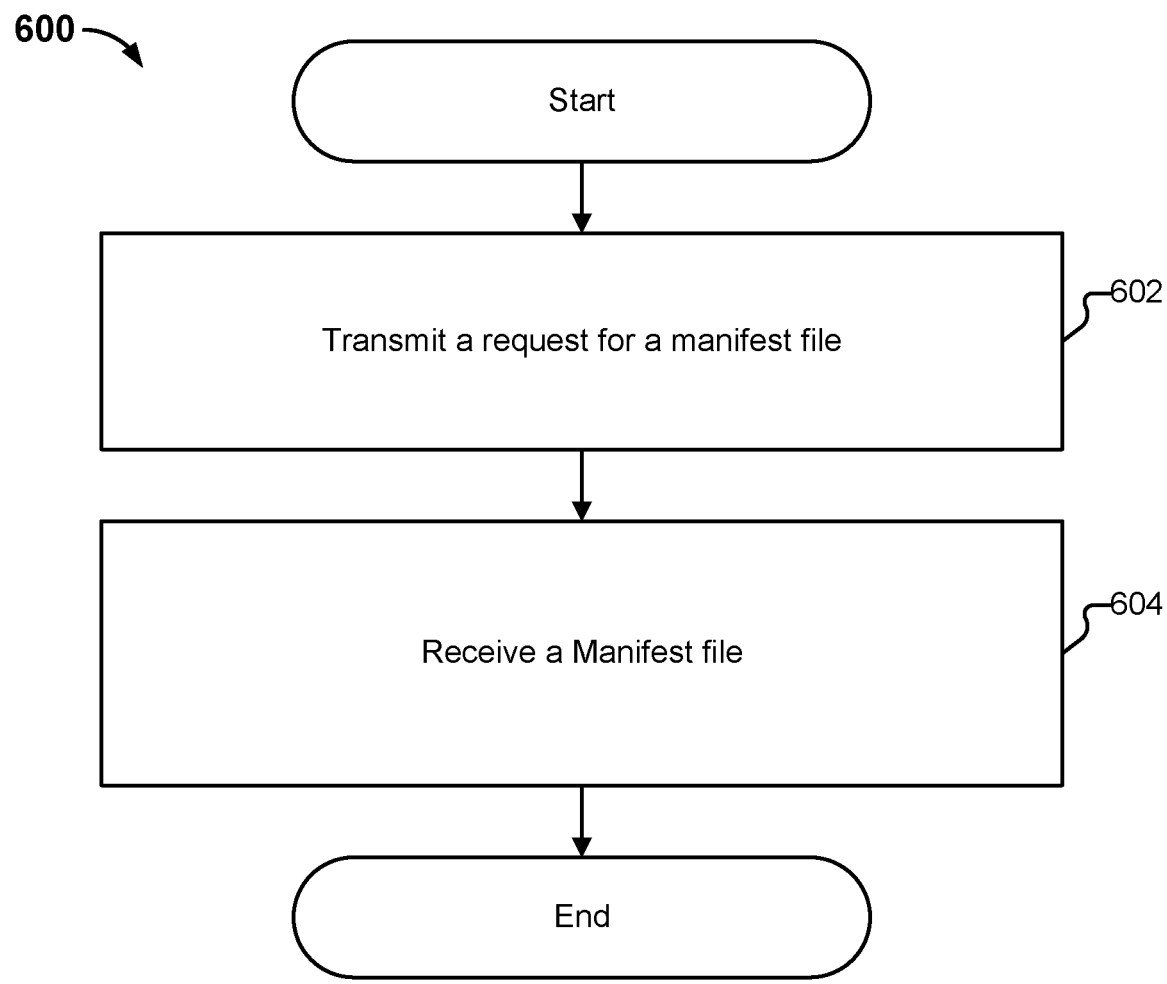
FIG. 6A is a flow diagram illustrating an embodiment of a process for obtaining an optimal bitrate range.

FIG. 6A is a flow diagram illustrating an embodiment of a process for obtaining an optimal bitrate range. In some embodiments, process 600 is executed by client 200 of FIG. 2A. The process begins at 602 when a request for a manifest file is transmitted. In some embodiments, the request for a manifest file is sent to an entity such as CMS 108 of FIG. 1A. The request for the manifest file is then redirected to a backend such as CDC 300 of FIG. 3. In some embodiments, the request for the manifest file includes metadata associated with the client, such as device model and network (e.g., ISP) of the client.

At 604, a manifest file is received. In some embodiments, the manifest file has been reduced (e.g., by CDC 300 of FIG. 3) from an original manifest file to include a usable (optimal) set of bitrates which have been determined as being able to be reliably played by the client. The reduced manifest file is received from an entity such as CDC 300 of FIG. 3, which is also configured to determine the usable set of bitrates for the client based on its metadata attributes, an evaluation of global shared data, as well as relevant policies (e.g., as described in process 500 of FIG. 5).

The client is then configured to obtain content according to the received manifest file. For example, the manifest file is provided to logic such as adaptive bitrate (ABR) logic resident on the client, which will use the determined optimal bitrate range (with which the manifest file has been rewritten) as the candidate, starting set of available bitrates when selecting a bitrate at which to obtain content.

Figure 6B:
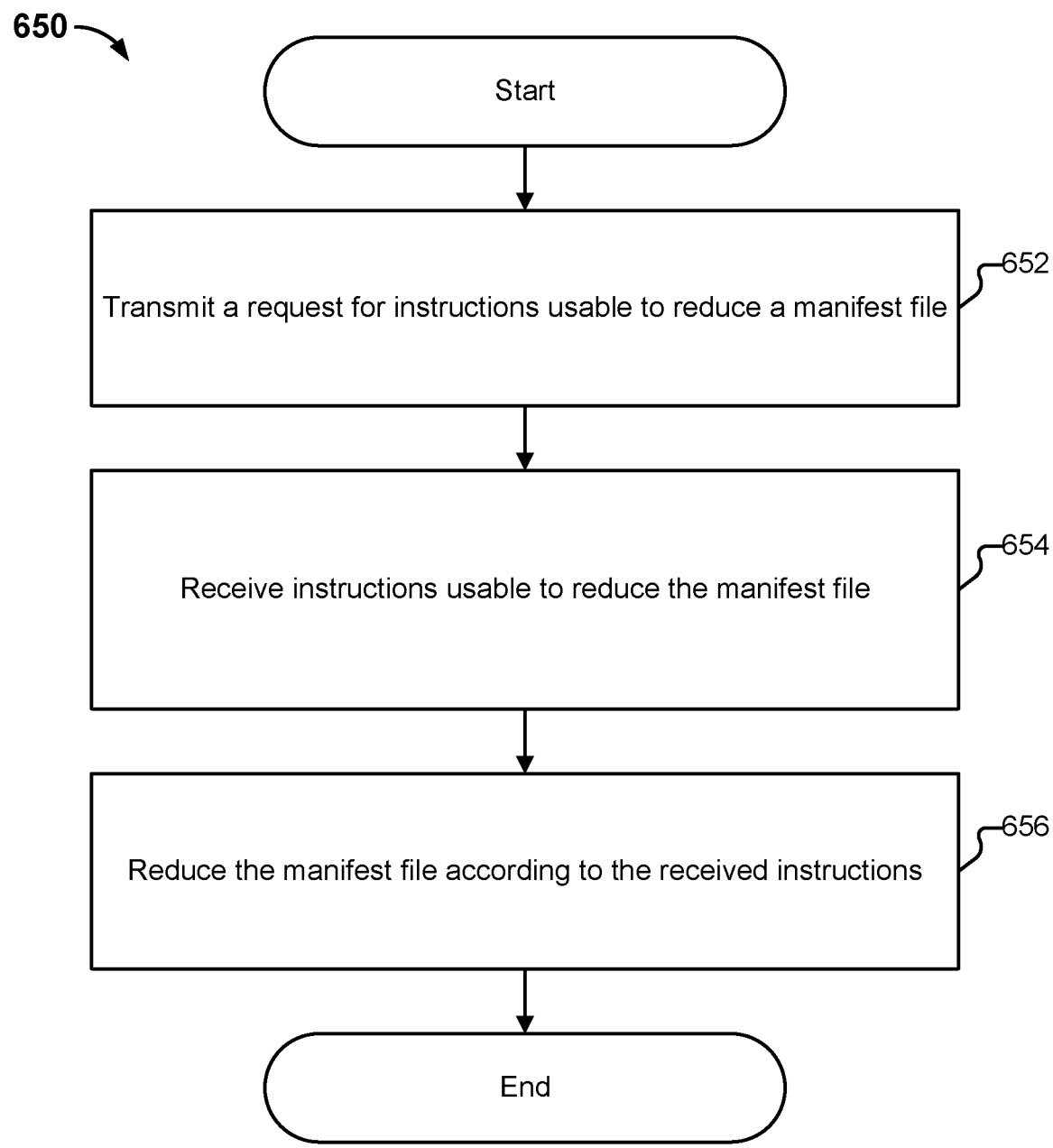
FIG. 6B is a flow diagram illustrating an embodiment of a process for obtaining an optimal bitrate range.

FIG. 6B is a flow diagram illustrating an embodiment of a process for obtaining an optimal bitrate range. In some embodiments, process 650 is executed by client 250 of FIG. 2B. The process begins at 652 when a request for instructions usable to reduce a manifest file is received. In some embodiments, the manifest file to be reduced is an original manifest obtained from an entity such as a CDN that includes the full set of available bitrates at which a content item is encoded.

In some embodiments, the request is transmitted to an entity such as CDC 300 of FIG. 3. The request can also include metadata information associated with the client, such as device model and network (e.g., ISP) of the client.

The request can also include a full list of bitrates. The full list of the bitrates is the full superset of bitrates included in the original manifest file. In some embodiments, the client is configured to parse the original manifest file and extract the full superset of bitrates to generate the full list that is transmitted in the request.

At 654, instructions usable to reduce the original manifest file are received. The instructions can be determined by an entity such as CDC 300 of FIG. 3 based on the metadata attributes of the client, an evaluation of global shared data, as well as relevant policies (e.g., as described in process 500 of FIG. 5). Various types of instructions can be received, as described above. As one example, a usable list of bitrates is received. In some embodiments, as described above, the usable list of bitrates is determined from the full list of bitrates provided by the client, and includes those bitrates in the full set that the client has been determined to be able to reliably play.

In some embodiments, bitrate cap and/or set of bitrates to be excluded is received. For example, the bitrate cap is the maximum bitrate that has been determined as the upperbound for the range of bitrates that the client can reliably play. The bitrates to be excluded include bitrates for which it is determined that the client should avoid playing (e.g., bitrates which it has been determined that the client cannot reliably play).

At 656, the original manifest file is reduced using the received instructions. For example, the client is configured with local logic to locally reduce the original manifest file. If a usable list of bitrates is received as instructions, reducing the original manifest file includes removing the bitrates in the original manifest file not included in the usable list (i.e., modifying the original manifest file to only include the bitrates in the determined usable list of bitrates). If a max bitrate is received as instructions, then all bitrates in the full set of bitrates included in the original manifest file that exceed the threshold bitrate are removed. If a set of bitrates to be excluded is also received, then those bitrates in the full set of bitrates that match to the excluded bitrates are removed accordingly.

In some embodiments, a new manifest file is generated from the original manifest file that only includes the appropriate/usable bitrate range determined for the client.

The client is then configured to obtain content according to the reduced manifest file. For example, the reduced manifest file is passed to logic such as ABR logic resident on the client, which will use the optimal bitrate range in the reduced manifest file as the candidate set of available bitrates when selecting a bitrate at which to obtain content.

A/B Testing

As described above, the content distribution coordinator is configured to facilitate experimentation (e.g., A/B testing) of different bitrates (e.g., using testing engine 318 of FIG. 3). By using the bitrate range control mechanisms described herein, entities such as publishers can perform experimentation to identify a full range of bitrates at which to encode content.

For example, delivering content at higher bitrates can incur increasing costs. Thus, before encoding content at new, higher bitrates, publishers may wish to determine whether encoding the content at the higher bitrates has benefits, such as increasing engagement. Using the techniques described herein, publishers can determine whether it is beneficial to allocate resources to introduce new, higher bitrates, and if so, how high the bitrates should go.

Using the testing engine, publishers (or any other appropriate entity) can perform experiments to determine if ever increasing bitrates result in higher engagement. Publishers can continue to experiment and try encoding at higher bitrates until engagement no longer occurs. The publisher can then identify the highest bitrate at which engagement is maximized, before increases in bitrate no longer have an impact on user engagement.

Example Experiment

The following is an example use case implementation of an experiment using the bitrate range control mechanism described herein. Using a policy engine such as policy engine 310 of CDC 300 of FIG. 3, an entity operating the experiment can configure a policy based on random A/B groups. The policy can be configured to specify that for 50% of viewers, a policy cap of 5 Mbps is to be enforced. The policy can be configured to specify that for the other 50% of viewers, a policy cap of 6 Mbps is to be enforced. This allows a fair comparison of the two bitrates to be performed. During the testing, quality metrics and engagement measures (e.g., a metric of the amount of time spent viewing a content item, the length of a session, etc.) associated with each group of viewers can be collected and evaluated to determine differences in engagement between the two populations, allowing the tester to determine whether introducing the higher 6 Mbps bitrate resulted in higher engagement. In this example experiment, while the analysis of global shared data can still be used to determine, on a per-client basis, an appropriate bitrate range (e.g., based on metadata associated with the client), the testing policy is used to provide further constraints on the maximum bitrate that can be provided to clients.

Thus, through the example experiment, the policy enforces a 50/50 random split through which engagement can be measured to determine whether introducing the new bitrate yielded higher engagement. The test can be repeated with higher bitrates being introduced to determine the impact of bitrate on engagement. The results of the test can then be outputted (e.g., in a report) to the tester. For example, a graph of bitrate versus engagement (e.g., with bitrate increasing along the X-axis, and increasing engagement on the y-axis) can be generated and provided to the tester.

The ability to perform a randomized test of the impact of bitrate on engagement is facilitated using bitrate range control/selection techniques described herein based on two factors. The first is the intelligence and data analysis that allows for bitrate ranges to be constrained lower for devices that cannot handle higher bitrates. The second factor is the configuration of policies which, when enforced, allow for random split A/B tests to be performed. Without the first factor, increasing bitrate may not necessarily result in higher engagement, as those viewers who do not have the capability to play the higher bitrate (e.g., because of device or ISP limitations) may in fact have a worse experience. By utilizing both analysis of aggregated data, as well as policy configuration to control the bitrate ranges provided to individual clients, such experimentation can be implemented.

Figure 7B:
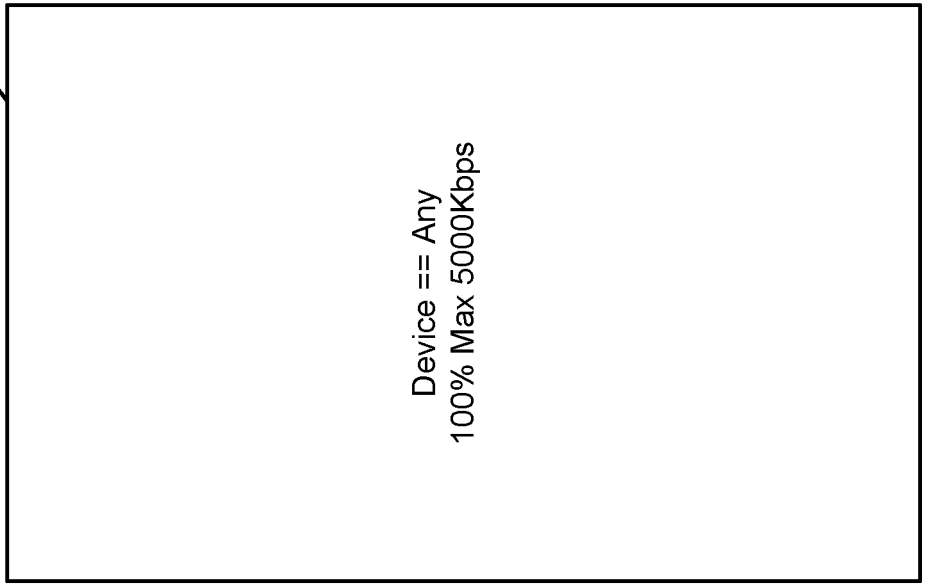
FIG. 7B illustrates an example of a policy
Figure 7A:
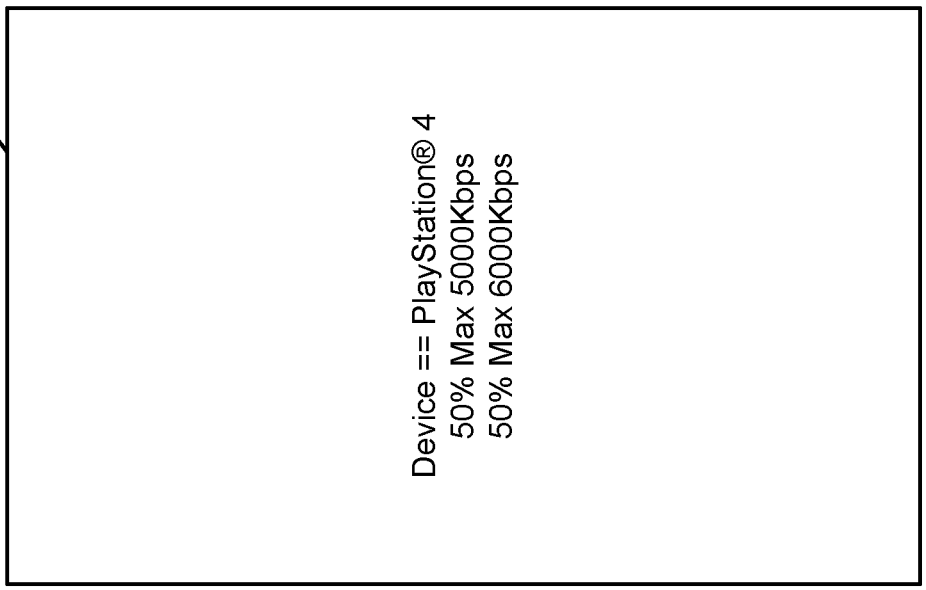
FIG. 7A illustrates an example of a policy configured to facilitate AB testing.

FIG. 7A is an example of a policy configured to facilitate A/B testing. In this example, policy 700 specifies rules for PlayStation® 4 devices. In this example, the policy specifies that for sessions involving a PlayStation® 4, 50% of the sessions are to be capped at 5 Mbps, while the remaining 50% of sessions are capped at 6 Mbps. This policy can be used to perform A/B testing for only devices matching the type of the first gaming device.

FIG. 7B is an example of a policy. In this example, policy 750 indicates that for all devices (device=any), cap 100% of sessions at 5 Mbps.

Policies 700 and 750 can be included in a list of policies, where the policies are evaluated in order. Thus, if a requesting client is identified from metadata as using a PlayStation® 4, policy 700, which specifies bitrate rules for PlayStation® 4 client devices, will be evaluated for that requesting device. The 50/50 randomized bitrate cap will then be applied (where the requesting client will either be capped at 5 Mbps or 6 Mbps). If the device is not a PlayStation® 4 gaming device, then policy 750 is evaluated, where the requesting client is capped at a max of 5 Mbps, according to the specification of the policy 750.

The results of the A/B testing can then be provided in a report (e.g., by reporting engine 316 of CDC 300 of FIG. 3). As shown in the examples of FIGS. 7A and 7B, policies can be configured that specify, for different conditions/dimensions (such as device model, ISP, etc., rules regarding the bitrates to be provided to clients. The rules include specifications in the manner in which bitrates are to be provided (e.g., percentage of clients to receive certain bitrates).

Additional Details regarding Bitrate Range Control

As described above, the various techniques for bitrate control described herein can be used for a variety of purposes, including to maximize engagement by aligning the provided bitrates to the capability of a specific device model and the Internet Service Provider (ISP) that the device is connected to. One scenario where this can be helpful is for mobile devices due to the device model heterogeneity and ISP (cellular, cable, DSL) heterogeneity. The examples and descriptions described herein relate to bitrate range control in a mobile environment. However, the techniques described here may be adapted accordingly to be applicable to other types of devices and/or in other contexts.

FIGS. 8A, 8B, 9A, and 9B show example graphs illustrating the issues faced given device model and ISP heterogeneity/variability, and the advantages of providing bitrates that are aligned to the capability of a specific device model and the ISP to which the device is connected. The graphs of FIGS. 8A and 9A represent the capability of several device models (bars of FIG. 8A) and several ISPs (bars of FIG. 9A). The horizontal line represents the maximum bitrate that a publisher may choose to offer. Since this is mostly static, publishers are typically forced to choose a maximum bitrate that compromises quality for high performance devices (or ISPs) to ensure the quality for lower performing devices (and ISPs) is decent. While ABR algorithms are designed to handle changing network congestion, the ABR algorithms may be limited when dealing with the vast heterogeneity of device and network capabilities. The graphs of FIGS. 8B and 9B represent the result of a bitrate control feature. What was a flat horizontal line is now matched closely with the capability of each device model and ISP, allowing the ABR algorithms in the devices to handle network congestion (as they were designed to) within the appropriate range.

Device Model Variability

FIGS. 8A and 8B illustrate example graphs with respect to device model variability. In the example of FIG. 8A, a static bitrate range (802) is manually selected, where the maximum bitrate of the range (represented by line 804) is a suboptimal selection based on compromises as described above. The same static bitrate range is provided to all devices regardless of device capability (represented by the bars in the graph, where each bar corresponds to a particular device type/model). Thus, in the example scenario of FIG. 8A, device ABR algorithms must handle hard capability limits and changing congestion.

In the example of FIG. 8B, the bitrate range provided to clients is automatically adjusted/tailored based in part on the device type of a client (as shown by line 806, which is matched to the capabilities of the particular device type). Such automatically selected bitrate ranges allow for an optimal bitrate range per device, without the compromises described above. Thus, the client-side ABR algorithm only needs to handle changing congestion.

ISP Variability

FIGS. 9A and 9B illustrate example graphs with respect to ISP variability. In the example of FIG. 9A, a static bitrate range (902) is manually selected, where the maximum bitrate of the range (represented by line 904) is a suboptimal selection based on compromises as described above. The same static bitrate range is provided to all devices regardless of the performance of the ISP that a device is on (represented by the bars in the graph, where each bar corresponds to a particular ISP). Thus, in the example scenario of FIG. 9A, device ABR algorithms must handle hard capability limits and changing congestion.

In the example of FIG. 9B, the bitrate range provided to clients is automatically adjusted/tailored based in part on the ISP of the client (as shown by the line 906, which is matched to the capabilities of the particular ISP). Such automatically selected bitrate ranges allow for an optimal bitrate range per device, without the compromises described above. Thus, the client-side ABR algorithm only needs to handle changing congestion.

In some embodiments, the bitrate range control functionality described herein allows for customized bitrate range selection (e.g., based on device type and/or ISP, or any other appropriate factor), maximizing quality and engagement by eliminating the need to compromise when selecting the full range of bitrates for encoding.

In some embodiments, the bitrate range control mechanism separates the functionality and intelligence needed to handle device model and ISP limitations/capabilities from device-level ABR algorithms, which are designed primarily to handle dynamic congestion.

In the examples of FIGS. 8A-9B, the bars represent the maximum bitrate a particular device model or ISP can handle. The line represents the maximum bitrate provided to each device model and defines the range. Since the maximum bitrate is static, a publisher is typically forced to compromise and select a suboptimal maximum bitrate (and bitrate range)

ADDITIONAL USE CASE EXAMPLES

The following are two example use cases/actions that leverage the bitrate range control mechanism described above, in which bitrates are provided that are aligned to the capability of a specific device model and the ISP to which the device is connected:

Automated selection of bitrate range: Ensuring that each device is given the appropriate range of bitrates on session start within the set of encoded bitrates. Since the dimensionality of factors to be considered is high, device model x ISP x location (where location is considered because ISP performance varies significantly between locations), manual selection of bitrate range is difficult. In some embodiments, the dimension selection is offline data-driven and the bitrate range is online data driven. The update frequency can be set based on offline analysis driven.

Experimentation to identify full range of bitrates to encode: To maximize the usage of bitrate range control and maximize engagement, the maximum encoded bitrate can be raised to, or above, the highest device/ISP combination (e.g., rather than being constrained based on compromise as described above with respect to FIGS. 8A and 9A). The numerical value of the maximum encoding bitrate will not be immediately known. The functionality of the bitrate range control mechanism can be used by a publisher (or other appropriate entity) to experiment with progressively higher bitrates to determine the maximum encoding bitrate. This experimentation can be done periodically (e.g., as device models and ISP capacities continue to evolve).

Use Case Example 1: Automated Mobile Device Bitrate Range Selection

Four example factors/dimensions that impact mobile device experience include: ISP and connection type (e.g., cable/DSL/cellular, Verizon/AT&T/Comcast/Verizon Wireless); location; device model; and content type.

As one example scenario, consider 50 locations, 20 ISPs, and 20 device models, which results in 20,000 combinations. Further considering live vs video-on-demand (vod) streaming, 40,000 combinations would result. There may potentially be a much higher number of combinations. An example table illustrating the various factors/dimensions is shown in FIG. 10.

Visual Representation of the Decisions

Figure 11:
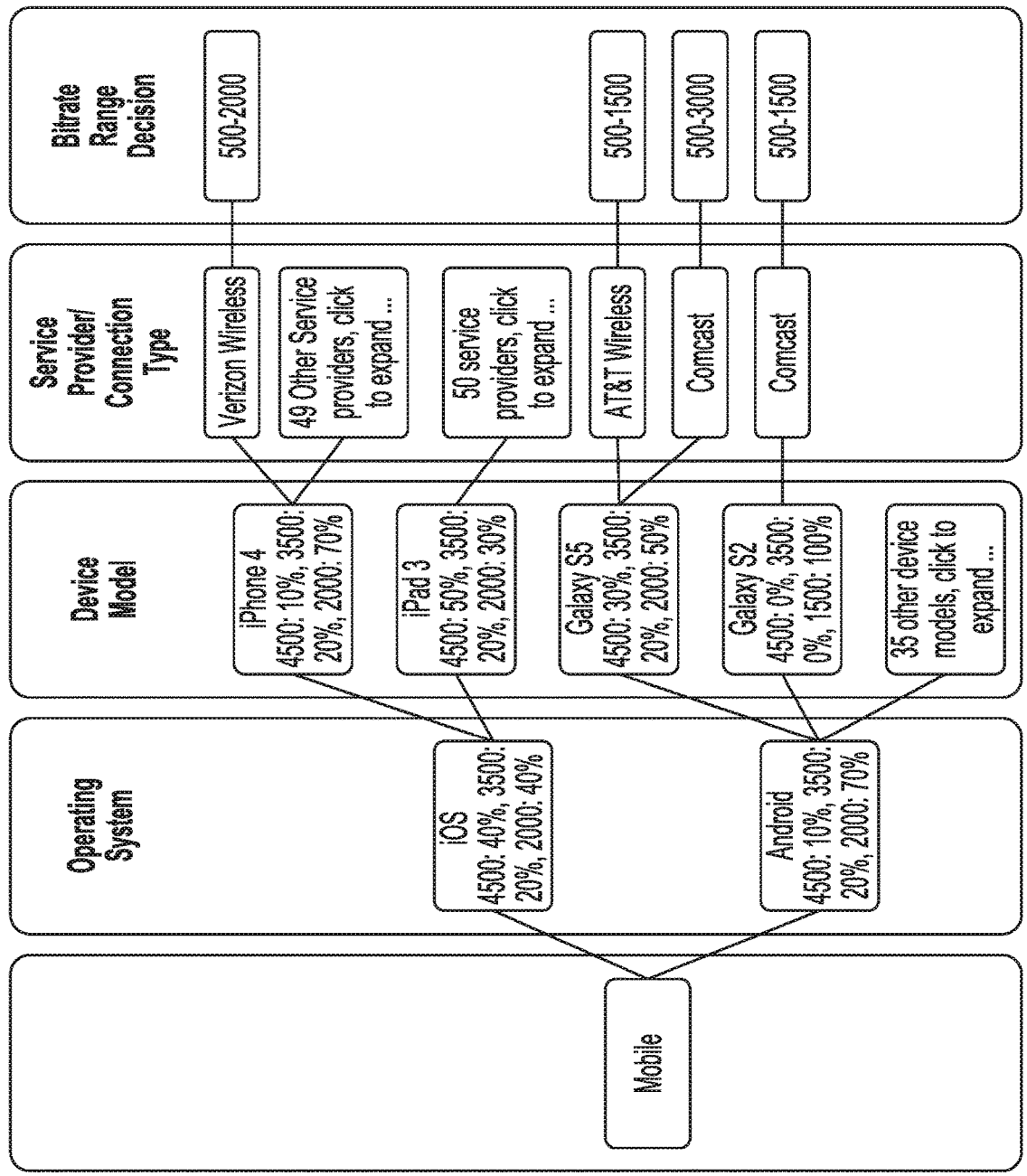
FIG. 11 is an example tree representation of bitrate range decision making.
Figure 12:
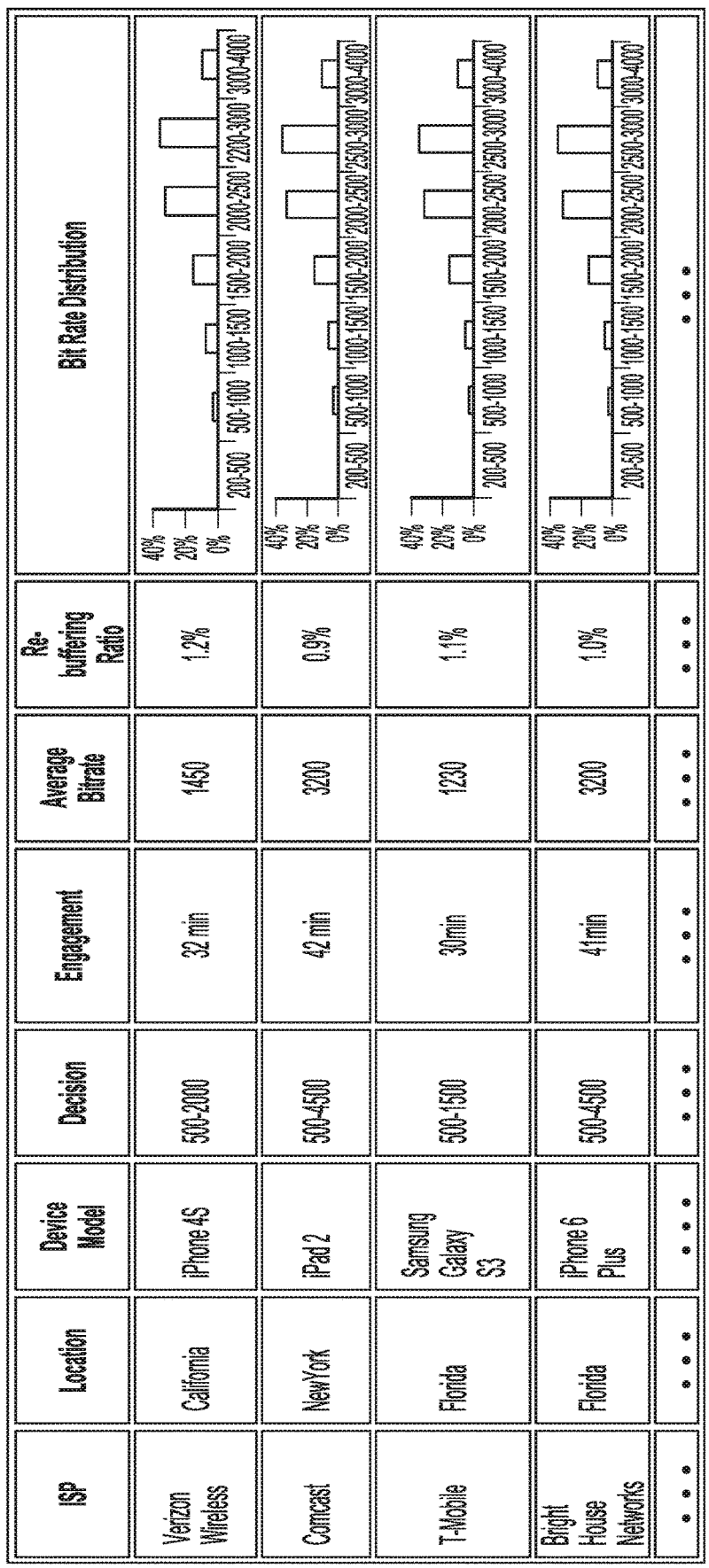
FIG. 12 illustrates an example table illustrating example decisions and impacts.

Multiple visualizations of the decision made by a bitrate range control mechanism can be presented. FIG. 11 is an example tree representation where a user can drill in to see the details of the decisions made. For example, the user can explore down to the leaves or summaries at each higher level node Example of Top combinations by volume/impact FIG. 12 illustrates an example table in which the top device model/ISP/location combinations by volume, and the decisions and impact for each one are shown.

Use Case Example 2: Manual Mobile Device Bitrate Management to Determine Max Bitrate ISPs that mobile devices can connect to offer a wide range of bandwidth capacities. For example, Verizon 4G LTE vs T-Mobile 3G vs Comcast Xfinity wired vs Comcast Xfinity mobile vs AT&T Uverse, etc.

The device model can have a significant impact on the set of bitrates that can be played (e.g., based on CPU performance, screen size, hardware acceleration, etc.)

In some embodiments, with an automated bitrate range selection system as described in use case example 1, a publisher can select a max bitrate and a full range of bitrates that maximizes engagement without needing to compromise. In some embodiments, with appropriate visibility into bitrate usage and engagement, a user (e.g., publisher) can reliably define the full range of bitrates.

In some embodiments, visibility can be provided into various aspects of streaming and content distribution. For example, visibility can be provided into the distribution of bitrate usage for each ISP, then for each bitrate (or bucket) to see the re-buffering ratio. As another example, visibility can be provided into the percent/number of bitrate switches away from each bitrate. As another example, visibility can be provided into the engagement for each bitrate bucket.

In some embodiments, inferences/actions can be made/taken. For example, if it is determined that there is significant usage of the top bitrates, the quality is on par or better than other bitrates, the number of bitrates switch aways (number of times that a bitrate was switched away from to another bitrate) is not significant, and engagement is highest on the high bitrates, then an attempt to introduce a higher bitrate can be recommended. The ISP and/or device model may be able to handle higher bitrates, yielding higher engagement.

As another example, if it is determined that there is usage of the highest bitrate(s), but the quality of the highest bitrate(s) is poor compared to the other bitrates, then it can be determined/suggested that the highest bitrate(s) for this ISP should be removed. In this example scenario, it has been inferred that the ISP cannot handle the highest bitrate(s), but because it has been provided to clients, the ABR algorithm resident on the clients continues to attempt to play the highest bitrate(s), resulting in poor quality.

As another example, if it is determined that there is usage of the highest bitrate(s) and the quality is on par with other bitrates(s), but the number of switches away from the highest bitrate(s) is significantly higher than from other bitrates, then it can be determined/suggested that the highest bitrate(s) for this ISP should be removed. In this example scenario, it has been inferred that the ISP cannot handle the highest bitrate(s), but because it has been provided to clients, the ABR algorithm will attempt to play it, resulting in many switch downs, impacting the experience.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
one or more processors configured to:
receive, over a network, an indication of a request for content;
receive a set of client attributes associated with a client associated with the request, the set of client attributes comprising of a device model associated with the client and an Internet Service Provider (ISP) associated with the client;
determine a plurality of clients that share the device model associated with the client and the ISP associated with the client;
use performance information associated with the plurality of clients determined to share the device model associated with the client and the ISP associated with the client to determine a set of aggregate quality metrics for a given bitrate or a given range of bitrates;
based at least in part on the set of aggregate quality metrics determined for the given bitrate or the given range of bitrates using the performance information associated with the plurality of clients determined to share the device model associated with the client and the ISP associated with the client, determine, from a set of bitrates at which the content is encoded, a subset of bitrates to be made available to the client to use to obtain the content; and
provide output to the client based at least in part on the subset of bitrates determined from the set of bitrates based at least in part on the set of aggregate quality metrics determined for the given bitrate or the given range of bitrates using the performance information associated with the plurality of clients determined to share the device model associated with the client and the ISP associated with the client, wherein the client is configured to obtain the content at least in part by selecting a bitrate from the subset of bitrates; and
a memory coupled to the one or more processors and configured to provide the one or more processors with instructions.

2. The system recited in claim 1 wherein the set of aggregate quality metrics determined for the given bitrate or range of bitrates comprises at least one of errors, frequency of bitrate switching events, buffering ratio, play time, and content completion rate.

3. The system recited in claim 1 wherein determining the subset of bitrates for the client comprises constraining the set of bitrates based at least in part on an aggregate quality score for sessions associated with the plurality of clients determined to share the device model associated with the client and the ISP associated with the client.

4. The system recited in claim 1 wherein determining the subset of bitrates further comprises applying a bitrate constraint according to a policy.

5. The system recited in claim 1 wherein determining the subset of bitrates for the client comprises determining at least one of a maximum threshold bitrate and a bitrate to exclude.

6. The system recited in claim 1 wherein the subset of bitrates comprises a set of bitrates that the client is determined to be capable of reliably playing.

7. The system recited in claim 1 wherein a type of the output provided to the client is determined based at least in part on a capability of the client to locally reduce a manifest file.

8. A method, comprising:
receiving, over a network, an indication of a request for content;
receiving a set of client attributes associated with a client associated with the request, the set of client attributes comprising a device model associated with the client and an Internet Service Provider (ISP) associated with the client;
determining a plurality of clients that share the device model associated with the client and the ISP associated with the client;
using performance information associated with the plurality of clients determined to share the device model associated with the client and the ISP associated with the client to determine a set of aggregate quality metrics for a given bitrate or a given range of bitrates;
based at least in part on the set of aggregate quality metrics determined for the given bitrate or the given range of bitrates using the performance information associated with the plurality of clients determined to share the device model associated with the client and the ISP associated with the client, determining, from a set of bitrates at which the content is encoded, a subset of bitrates to be made available to the client to use to obtain the content; and
providing output to the client based at least in part on the subset of bitrates determined from the set of bitrates based at least in part on the set of aggregate quality metrics determined for the given bitrate or the given range of bitrates using the performance information associated with the plurality of clients determined to share the device model associated with the client and the ISP associated with the client, wherein the client is configured to obtain the content at least in part by selecting a bitrate from the subset of bitrates.

9. The method of claim 8 wherein the set of aggregate quality metrics determined for the given bitrate or range of bitrates comprises at least one of error events, frequency of bitrate switching events, buffering ratio, play time, and content completion rate.

10. The method of claim 8 wherein determining the subset of bitrates for the client comprises constraining the set of bitrates based at least in part on an aggregate quality score for sessions associated with the plurality of clients determined to share the device model associated with the client and the ISP associated with the client.

11. The method of claim 8 wherein determining the subset of bitrates further comprises applying a bitrate constraint according to a policy.

12. The method of claim 8 wherein determining the subset of bitrates for the client comprises determining at least one of a maximum threshold bitrate and a bitrate to exclude.

13. The method of claim 8 wherein the subset of bitrates comprises a set of bitrates that the client is determined to be capable of reliably playing.

14. The method of claim 8 wherein a type of the output provided to the client is determined based at least in part on a capability of the client to locally reduce a manifest file.

15. A computer program product embodied in a non-transitory computer readable storage medium and comprising computer instructions for:
receiving, over a network, an indication of a request for content;

receiving a set of client attributes associated with a client associated with the request, the set of client attributes comprising a device model associated with the client and an Internet Service Provider (ISP) associated with the client;

determining a plurality of clients that share the device model associated with the client and the ISP associated with the client;

using performance information associated with the plurality of clients determined to share the device model associated with the client and the ISP associated with the client to determine a set of aggregate quality metrics for a given bitrate or a given range of bitrates;

based at least in part on the set of aggregate quality metrics determined for the given bitrate or the given range of bitrates using the performance information associated with the plurality of clients determined to share the device model associated with the client and the ISP associated with the client, determining, from a set of bitrates at which the content is encoded, a subset of bitrates to be made available to the client to use to obtain the content; and providing output to the client based at least in part on the subset of bitrates determined from the set of bitrates based at least in part on the set of aggregate quality metrics determined for the given bitrate or the given range of bitrates using the performance information associated with the plurality of clients determined to share the device model associated with the client and the ISP associated with the client, wherein the client is configured to obtain the content at least in part by selecting a bitrate from the subset of bitrates.

* * * * *

UNITED STATES PATENT AND TRADEMARK OFFICE
CERTIFICATE OF CORRECTION

PATENT NO. : 10,848,436 B1  
APPLICATION NO. : 16/197102  
DATED : November 24, 2020  
INVENTOR(S) : Aditya Ravikumar Ganjam et al.

Page 1 of 1

It is certified that error appears in the above-identified patent and that said Letters Patent is hereby corrected as shown below:

In the Specification

In Column 1, Line(s) 60, delete "AB" and insert --A/B--, therefor.

In Column 1, Line(s) 61, after "policy", insert --.--, therefor.

In Column 15, Line(s) 60, delete "AB" and insert --A/B--, therefor.

In Column 26, Line(s) 37, delete "Fig. 10A" and insert --Fig. 1A--, therefor.

In Column 27, Line(s) 53, delete "AB" and insert --A/B--, therefor.

In Column 30, Line(s) 22, after "device", insert --.--, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*